June 17, 1930. B. D. CHAMBERLIN 1,764,066
AUTOMATIC CAMERA
Original Filed Jan. 29, 1921 17 Sheets-Sheet 1
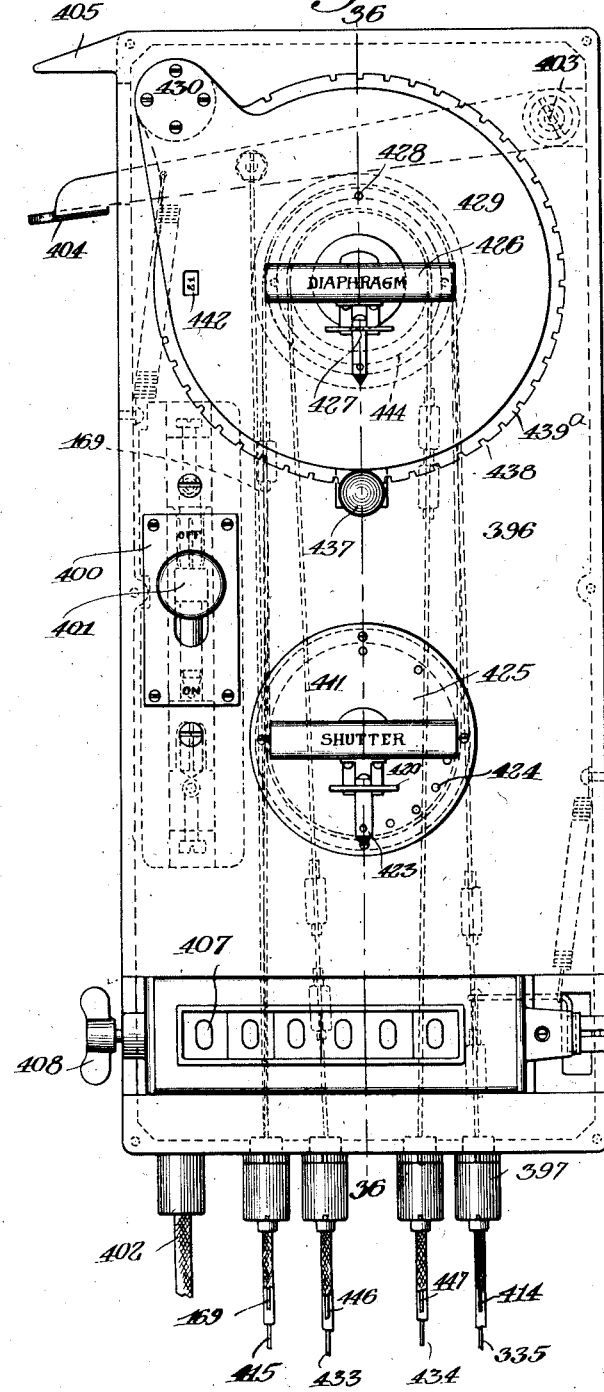

June 17, 1930.   B. D. CHAMBERLIN   1,764,066
AUTOMATIC CAMERA
Original Filed Jan. 29, 1921   17 Sheets-Sheet 2
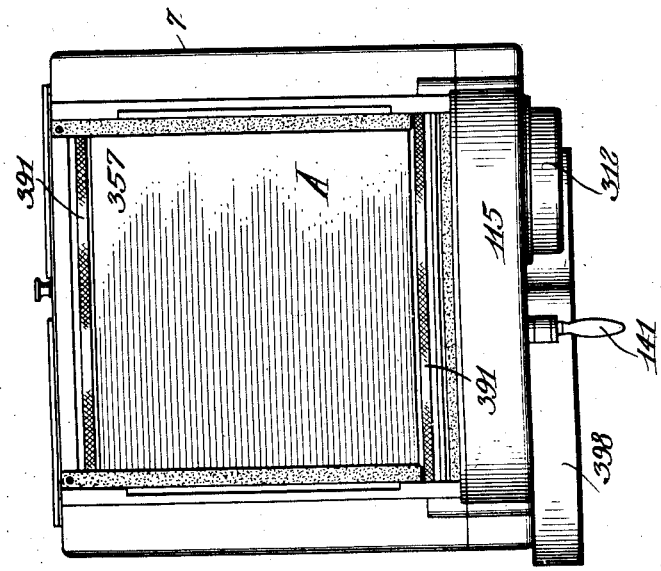
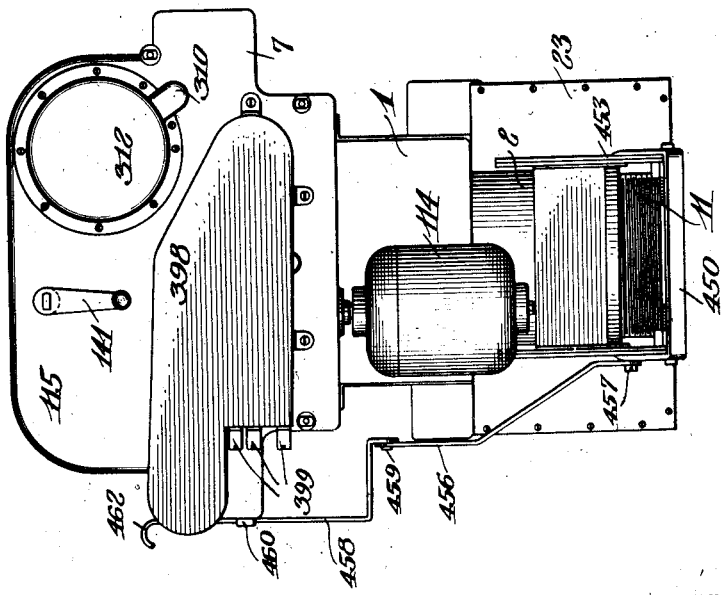
INVENTOR.
Benjamin D. Chamberlin
BY
his ATTORNEY

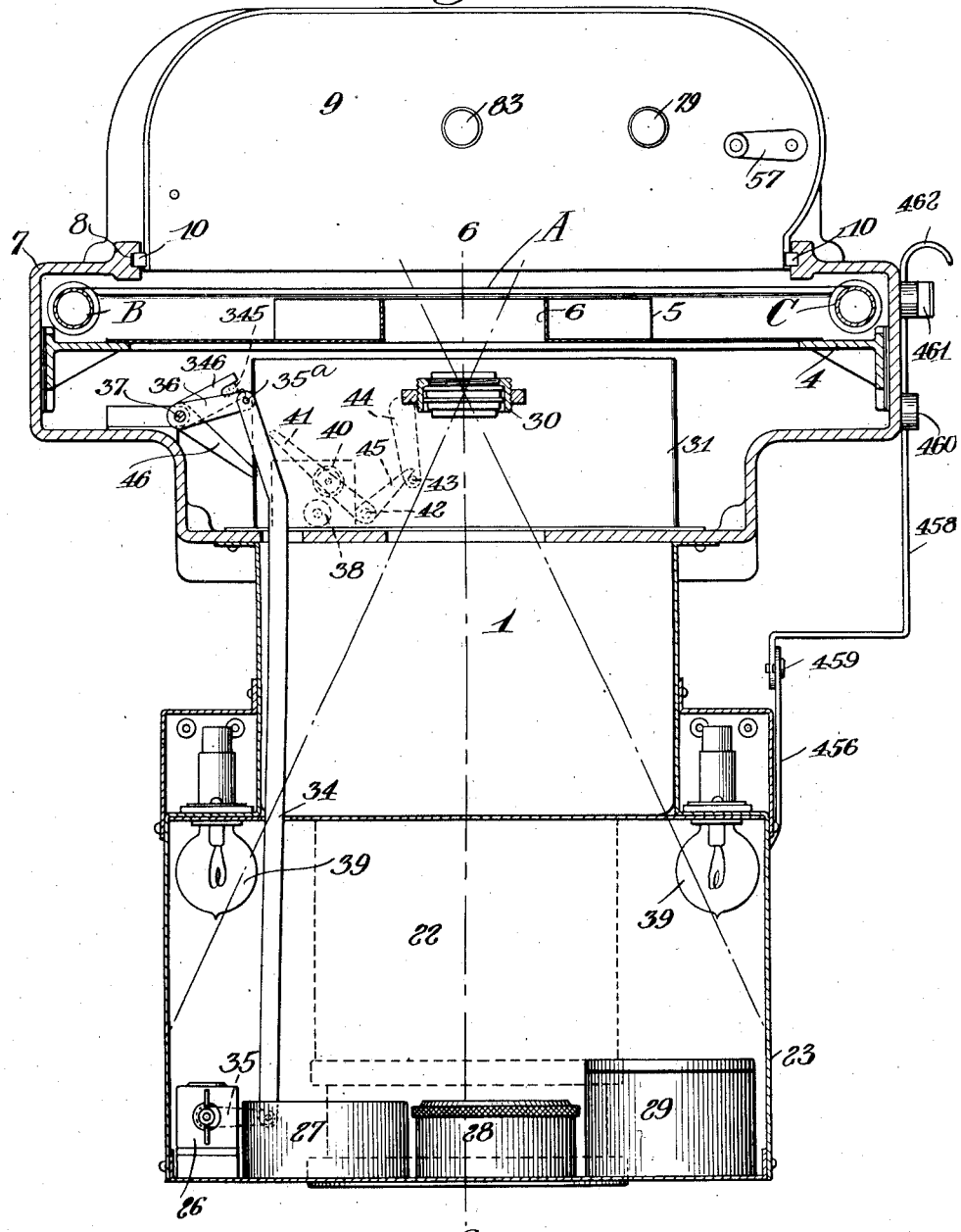

June 17, 1930.  B. D. CHAMBERLIN  1,764,066
AUTOMATIC CAMERA
Original Filed Jan. 29, 1921  17 Sheets-Sheet 4

INVENTOR.
Benjamin D. Chamberlin
BY
his ATTORNEY

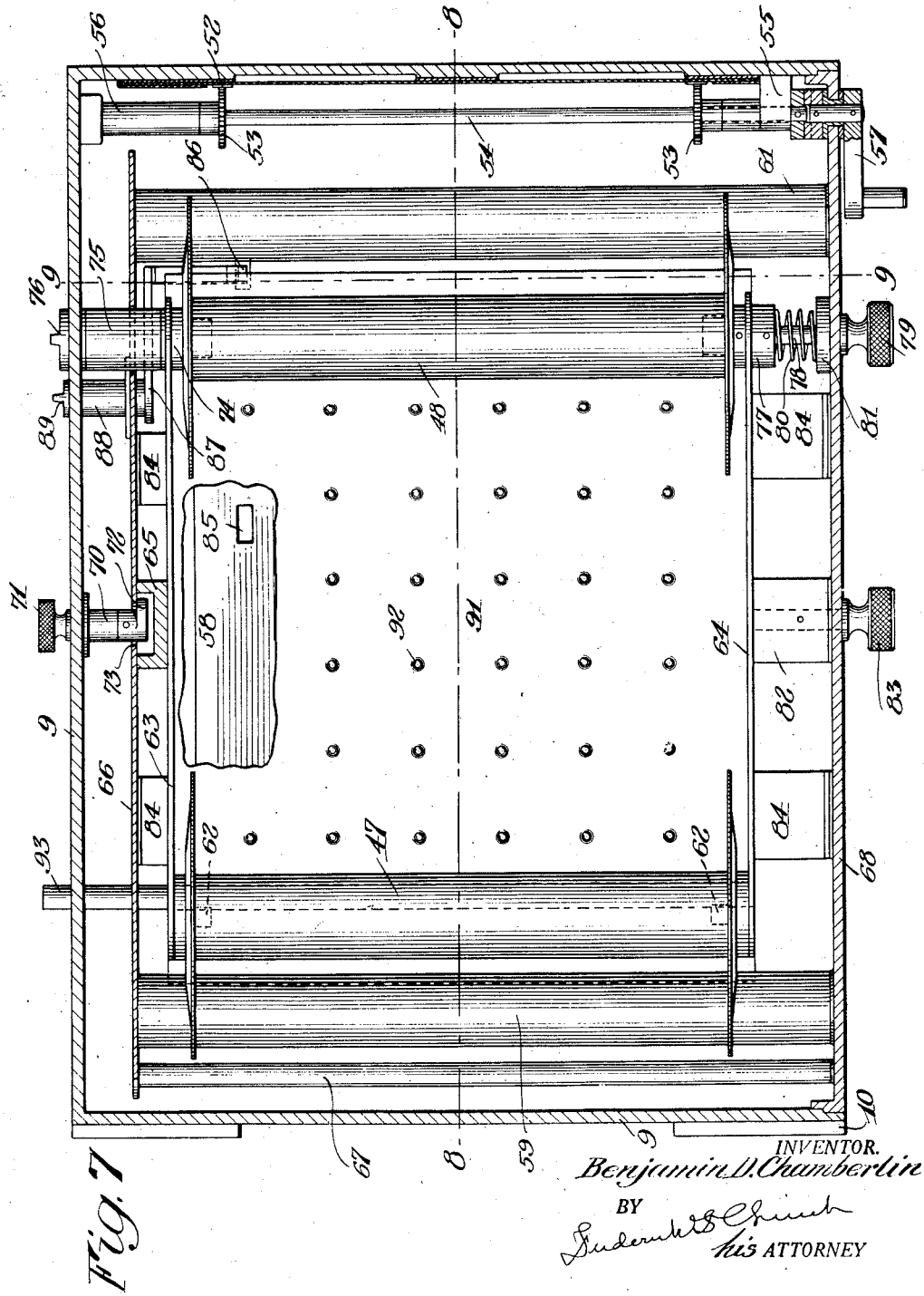

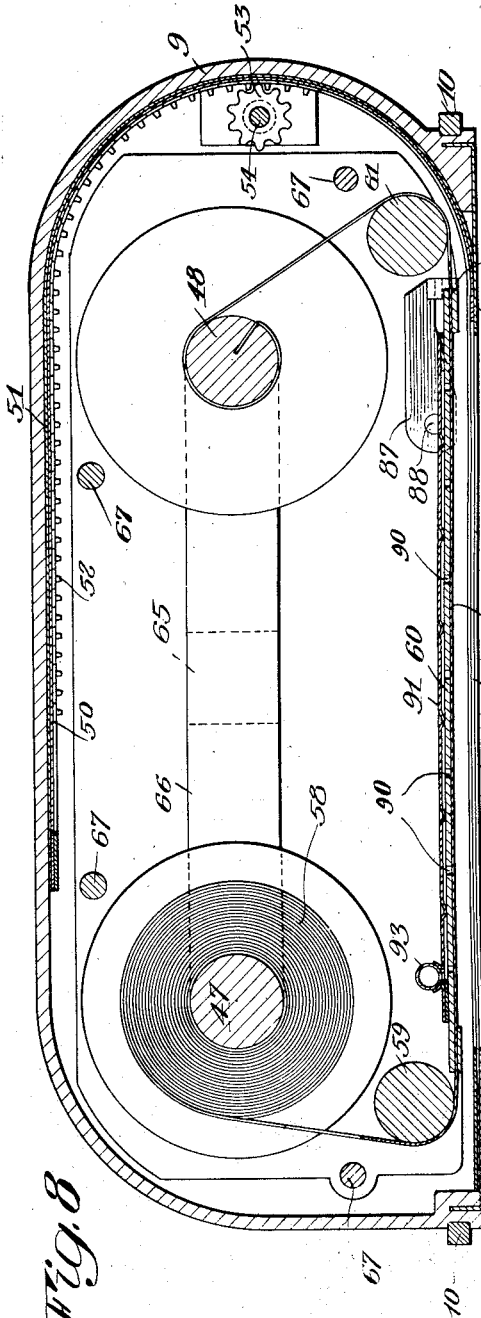
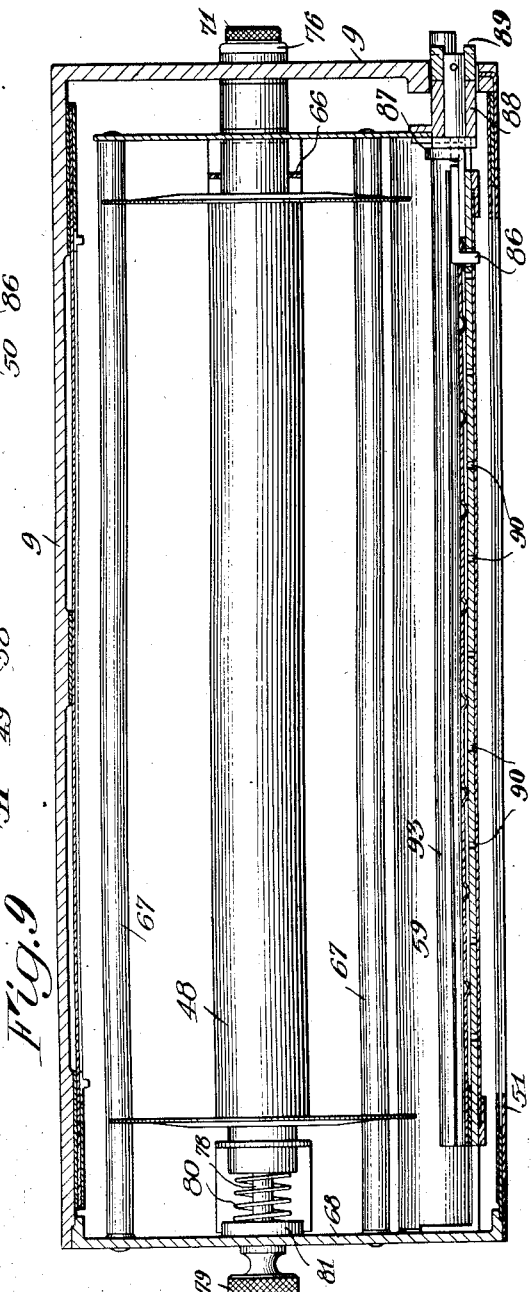

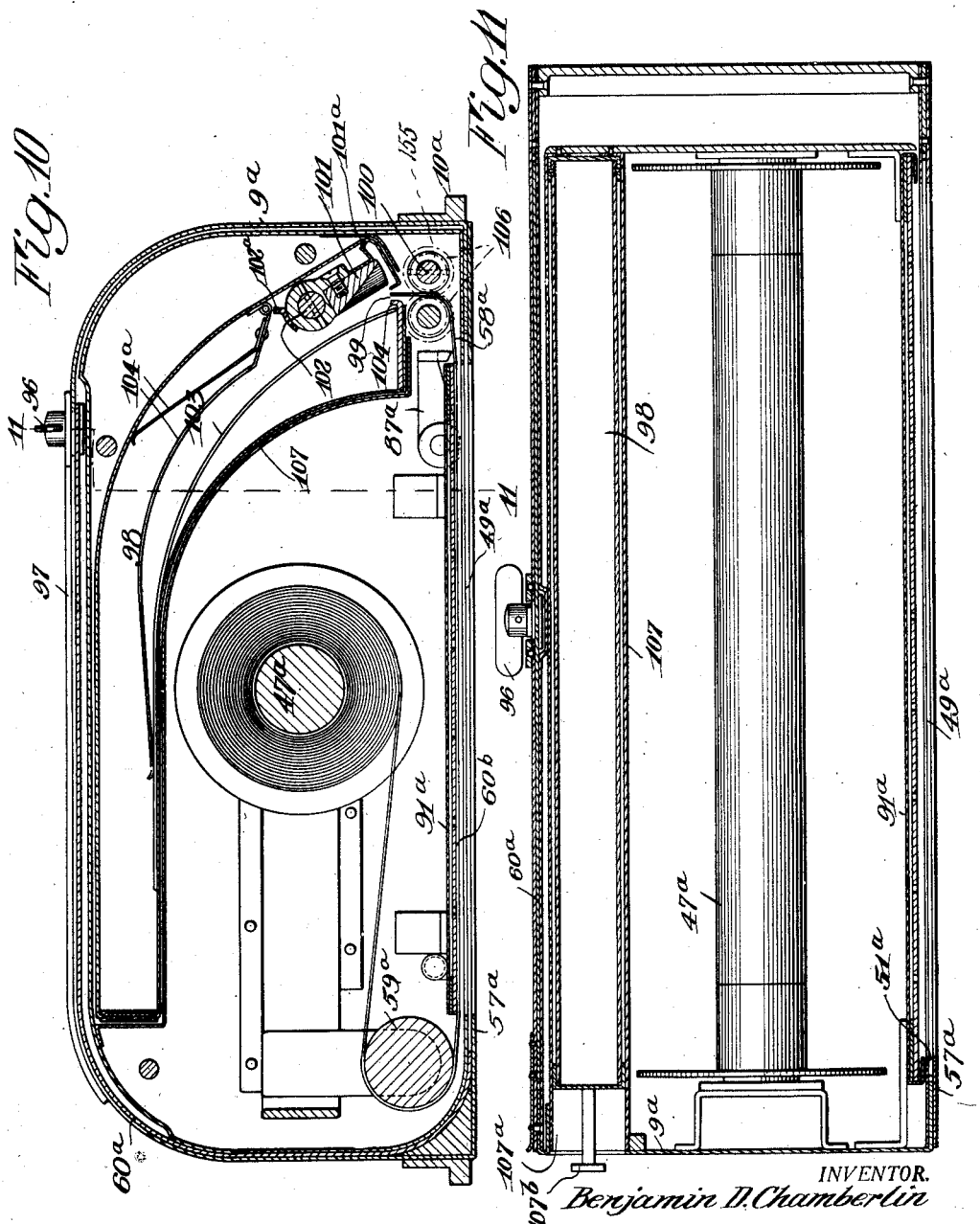

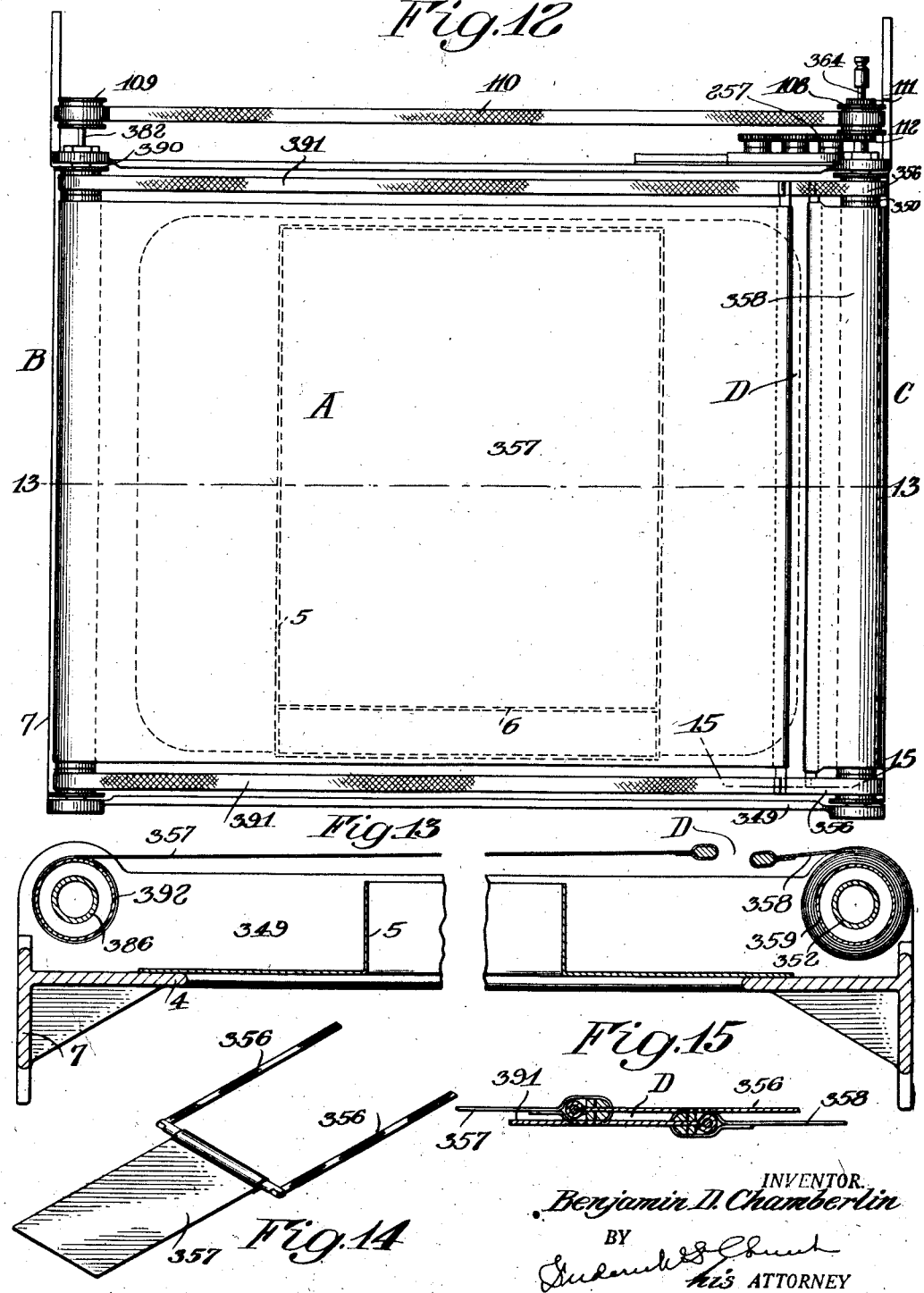

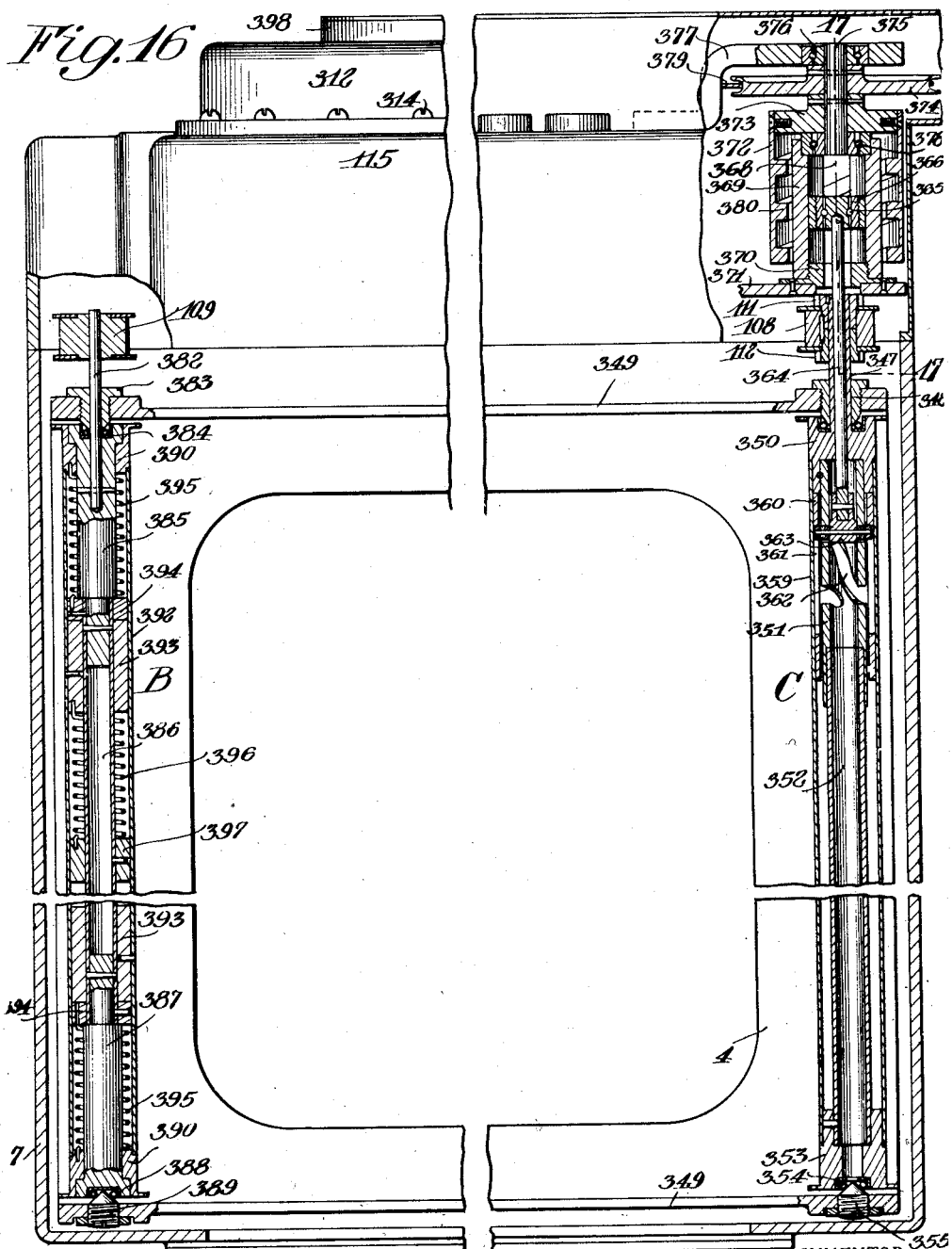

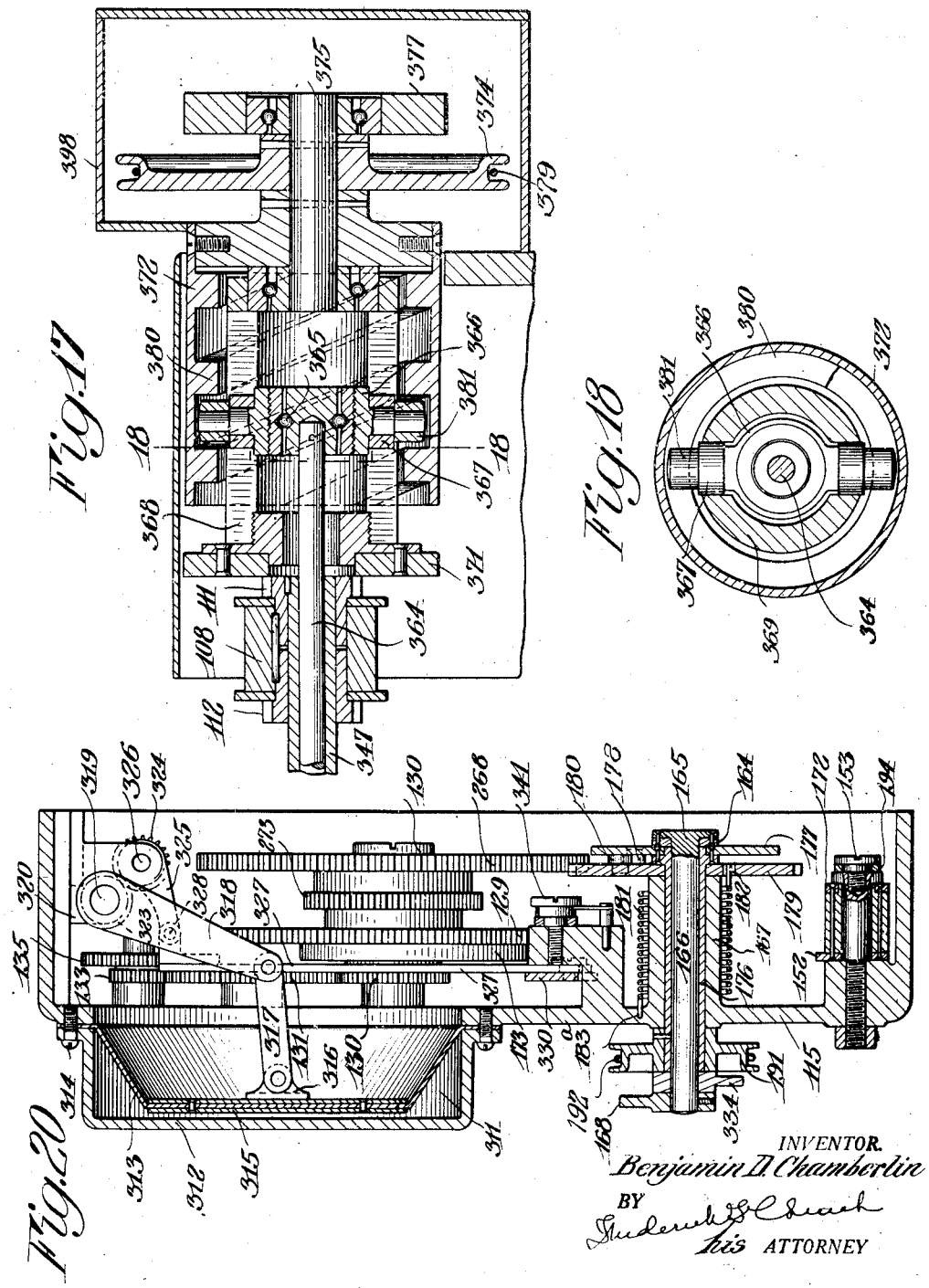

June 17, 1930.  B. D. CHAMBERLIN  1,764,066
AUTOMATIC CAMERA
Original Filed Jan. 29, 1921   17 Sheets-Sheet 11

INVENTOR.
Benjamin D. Chamberlin
BY
his ATTORNEY

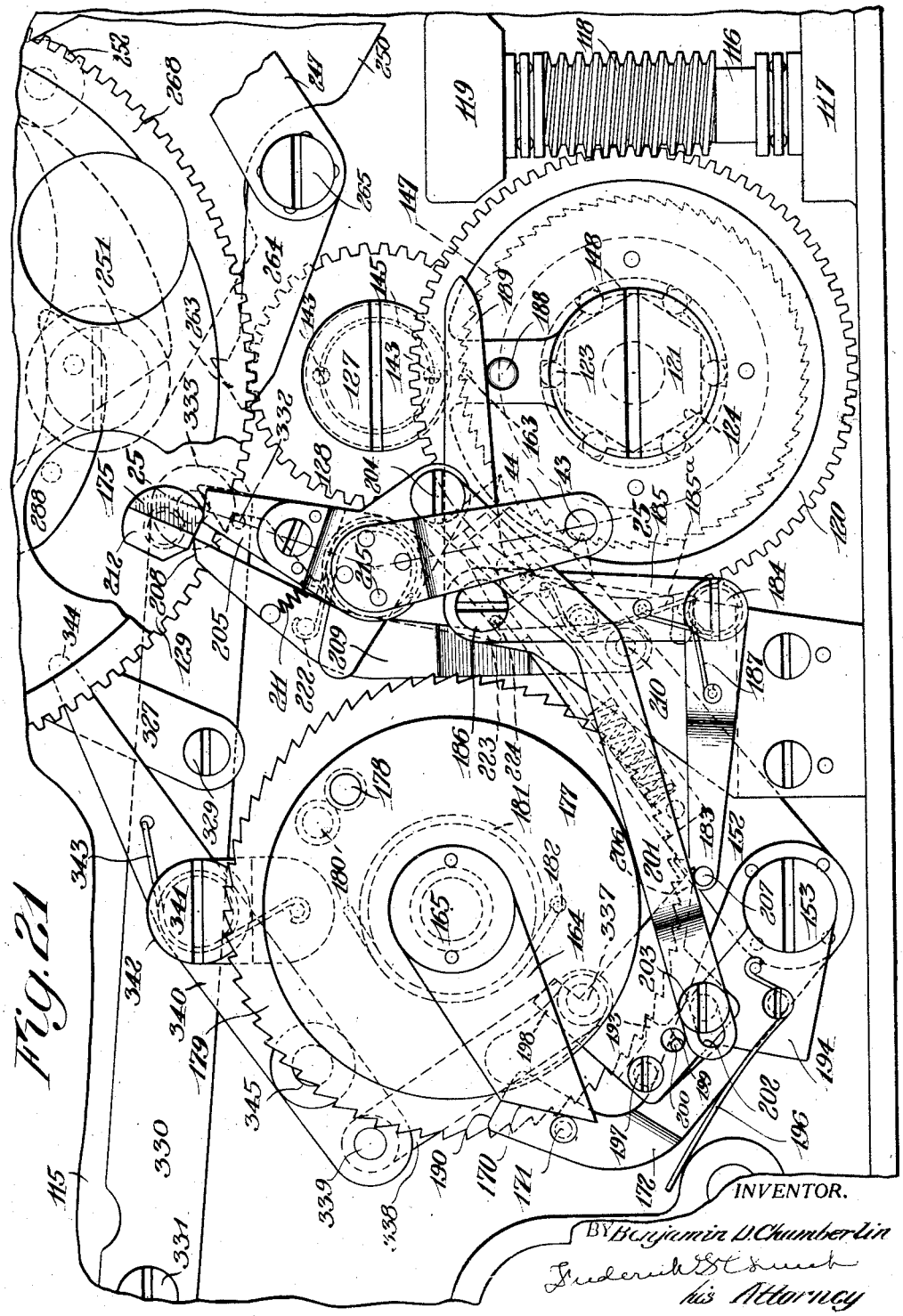

June 17, 1930.  B. D. CHAMBERLIN  1,764,066
AUTOMATIC CAMERA
Original Filed Jan. 29, 1921   17 Sheets-Sheet 13

INVENTOR.
Benjamin D. Chamberlin
BY
Frederick S. Church
his ATTORNEY

June 17, 1930.  B. D. CHAMBERLIN  1,764,066
AUTOMATIC CAMERA
Original Filed Jan. 29, 1921  17 Sheets-Sheet 14

INVENTOR
Benjamin D. Chamberlin
BY
his ATTORNEY

June 17, 1930.    B. D. CHAMBERLIN    1,764,066
AUTOMATIC CAMERA
Original Filed Jan. 29, 1921    17 Sheets-Sheet 15

INVENTOR
Benjamin D. Chamberlin
BY
Frederick B Church
his ATTORNEY

June 17, 1930.  B. D. CHAMBERLIN  1,764,066
AUTOMATIC CAMERA
Original Filed Jan. 29, 1921  17 Sheets-Sheet 16
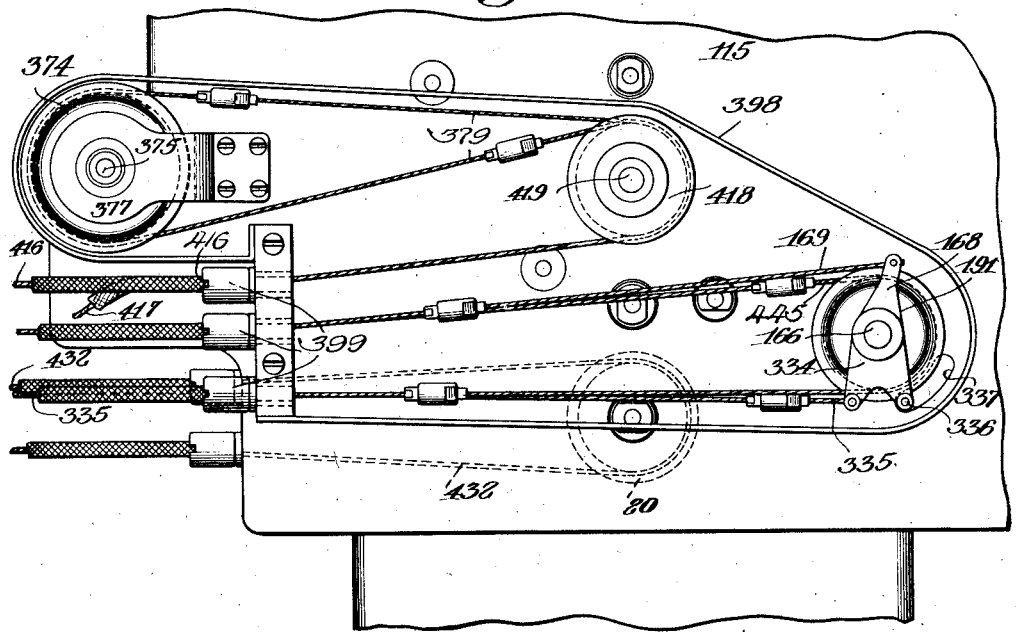
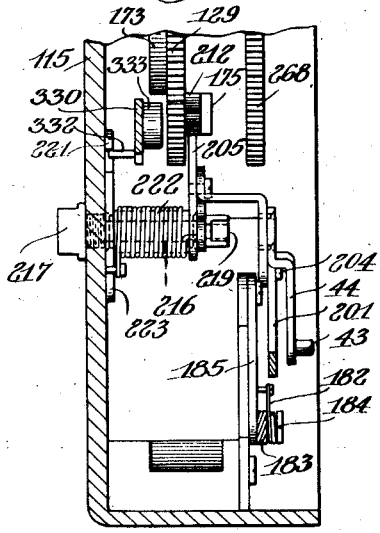
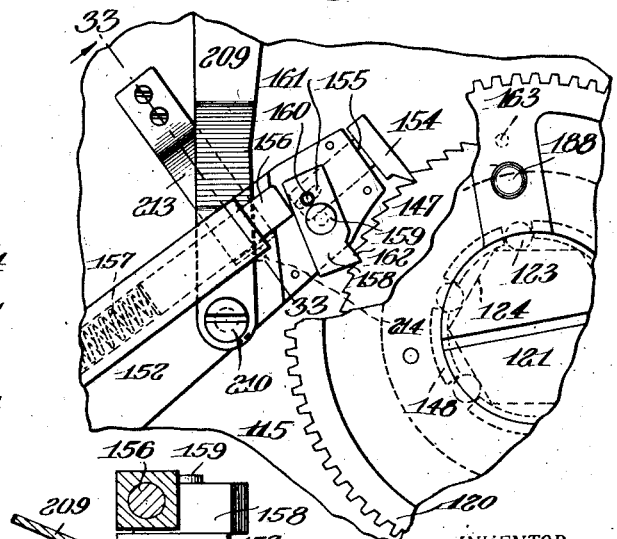
INVENTOR.
Benjamin D. Chamberlin
BY
his ATTORNEY June 17, 1930.  B. D. CHAMBERLIN  1,764,066
AUTOMATIC CAMERA
Original Filed Jan. 29, 1921   17 Sheets-Sheet 17
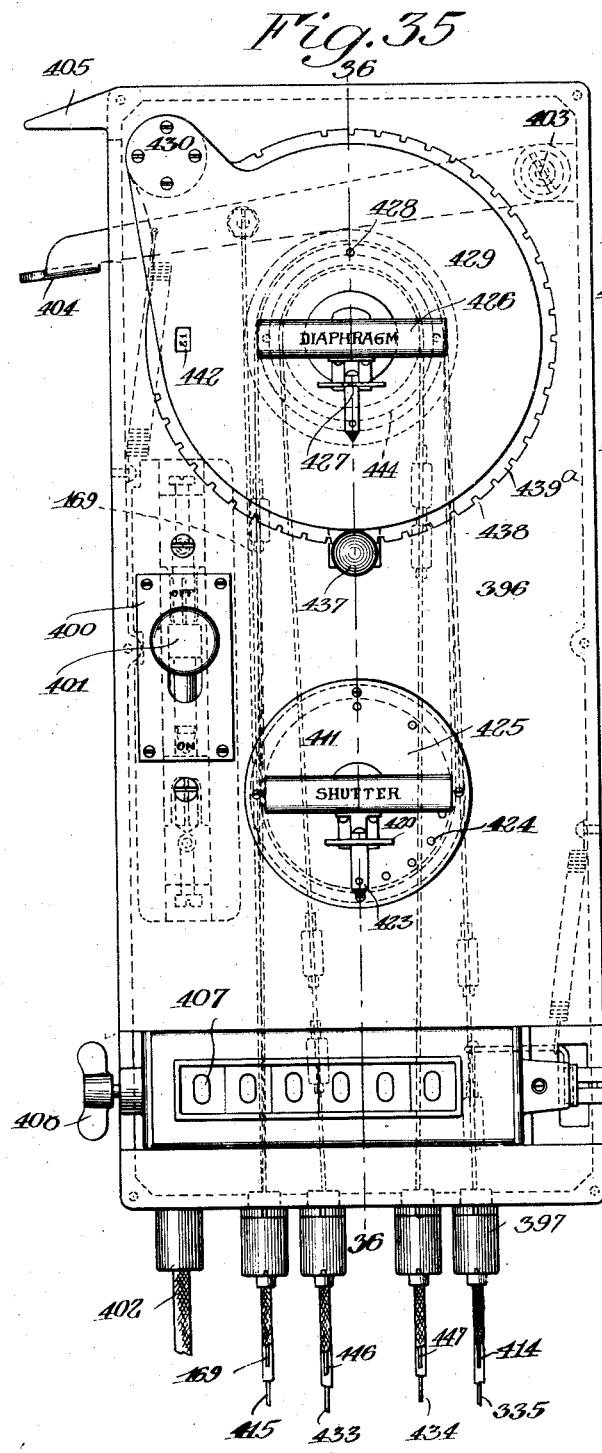
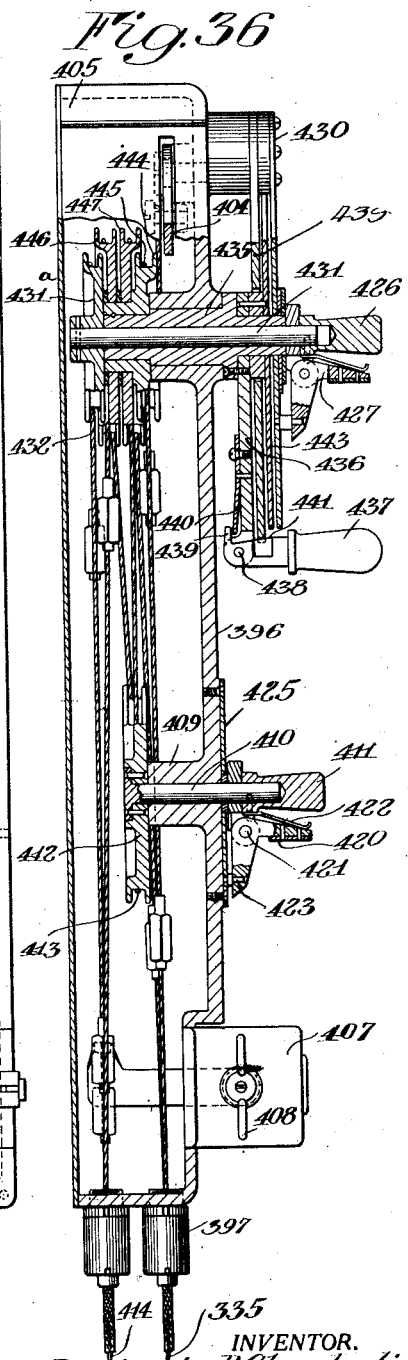
INVENTOR.
Benjamin D. Chamberlin
BY
his ATTORNEY.

Patented June 17, 1930

1,764,066

UNITED STATES PATENT OFFICE

BENJAMIN DAY CHAMBERLIN, OF ROCHESTER, NEW YORK, ASSIGNOR TO EASTMAN KODAK COMPANY, OF ROCHESTER, NEW YORK, A CORPORATION OF NEW YORK

AUTOMATIC CAMERA

Application filed January 29, 1921, Serial No. 440,908. Renewed July 25, 1929.

My present invention relates to photography and more particularly to automatic cameras of the type in which an organized mechanism preferably driven from a single source of power, operates through a cycle to perform successively, a plurality of operations incident to making a photographic exposure such as driving a shutter, winding film etc. and the invention has for its object to provide an improved camera of this nature that will be particularly adapted for use in an aeroplane in aerial photography, particularly in mapping, surveying and topographical work generally. The improvements are directed in part toward the general driving and controlling mechanism, the timing gear through which the proper frequency of exposure is effected, the shutter mechanism, the film winding mechanism and the manual controls placed at a distance from the camera and near the operator and adapted to start, stop and adjust the various groups of gearing. To these and other ends the invention resides in certain improvements and combinations of parts all as will be hereinafter more fully described, the novel features being pointed out in the claims at the end of the specification.

In the drawings:

Figure 1 is a side view of an automatic aerial camera constructed in accordance with and illustrating one embodiment of my invention;

Figure 2 is an end or rear view of the camera;

Figure 3 is a view of the opposite side of the camera from that shown in Figure 1;

Figure 4 is a top view with the roll holder removed;

Figure 5 is an enlarged vertical sectional view taken through the instrument chamber of the camera, substantially on the line 5—5 of Figure 2;

Figure 7 is an enlarged horizontal section through one of the two interchangeable types of roll holders that I contemplate using;

Figure 8 is a vertical section through the same roll holder on the line 8—8 thereof;

Figure 9 is a transverse vertical section through the same roll holder on the line 9—9 of Figure 7;

Figure 10 is an enlarged vertical section through the other type of roll holder;

Figure 11 is a transverse section through the same roll holder on the line 11—11 of Figure 10;

Figure 12 is an enlarged plan view of the focal plane curtain shutter that I prefer to use;

Figure 13 is a vertical section through said shutter on the line 13—13 of Figure 12;

Figure 14 is a detail perspective view of one of the curtains of the shutter and its winding tapes;

Figure 15 is an enlarged detail section on the line 15—15 of Figure 12, showing the relative positions of the tapes in fixing the shutter aperture;

Figure 16 is a horizontal section through the camera in the plane of the shutter winding rolls and the controlling mechanism therefor, some parts of the camera being in elevation or broken away;

Figure 17 is a further enlarged section through the shutter controlling mechanism on the line 17—17 of Figure 16;

Figure 18 is a vertical section on the line 18—18 of Figure 17;

Figure 20 is a vertical transverese section taken on the line 20—20 of Figure 19, looking in the direction of the arrow;

Figure 21 is an enlarged view of part of the mechanism shown in Figure 19 and particularly of what I term the "frequency mechanism";

Figure 31 is a fragmentary sectional view on the line 31—31 of Figure 19;

Figure 32 is a fragmentary view with parts broken away, of the stop pawl of the main clutch, as shown in dotted lines in Figure 21;

Figure 33 is a detail section on the line 33—33 of Figure 32;

Figure 34 is an enlarged fragmentary view of part of the distant control mechanism located on the interior of the casing that is shown in elevation in Figure 3;

Figure 35 is an elevation of the hand-operated devices or control box of the distant control mechanism, and Figure 36 is a section thereof on the line 36—36 of Figure 35.

Similar reference numerals throughout the several views indicate the same parts.

Figure 6:
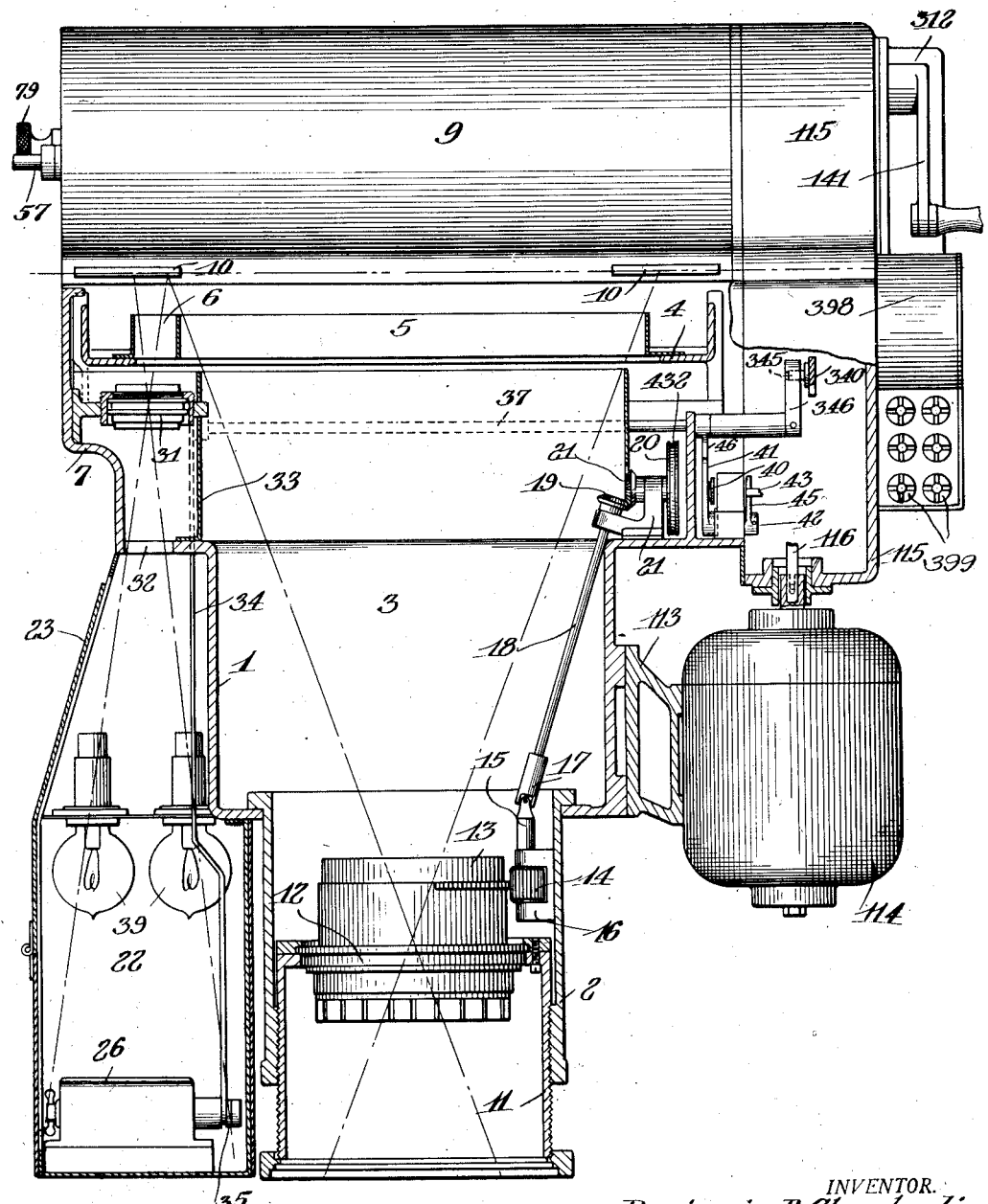
Figure 6 is an enlarged vertical sectional view through the instrument chamber and also the exposure chamber of the main camera, on substantially the line 6—6 of Figure 5.

My improved camera herein described is preferably mounted in the aeroplane and moved bodily to change the view in accordance with the invention set forth in my copending application, Serial Number 537,099 filed February 16th, 1922, now Patent 1,502,173, granted May 22, 1924, the present application being restricted to the camera per se and the various mechanisms associated with the operation of actually making exposures.

To first give a general idea of the structure involved and its accomplishments, I provide a camera body disposed, in aerial work, with its optical axis vertical and fitted at the top with a detachable light-tight roll holder that may be either of a type in which a roll of film is exposed and rewound into a roll or one in which a roll of film is exposed and the exposed areas immediately severed and stored in a dark chamber as separate sheets. The camera body includes a dark chamber containing a number of instruments, the readings of which at the time of making an exposure, are valuable in connection with a later reading of the photograph itself and through a separate lens but with the use of a single focal plane curtain shutter, these instruments are photographed on the margin of the picture, the dark chamber being artificially illuminated electrically in timed relation to the movement of the shutter. A vacuum producing means holds the film flat in the focal plane during exposure.

The foregoing operations properly synchronized are effected through a unitary driving and controlling mechanism embodying a motive power operating continually at uniform speeds. In regulatable connection with this motive power is a cycle member one revolution of which either actuates, trips, or stores energy in each of the various mechanisms, successively, these mechanisms being arranged in groups about the cycle member. Several of these secondary mechanisms are not directly actuated by the cycle member but by spring motors of their own which are tripped by the cycle member but rewound on the same cycle in preparation for the succeeding cycle and exposure.

The camera may be used for snap shots at the will of the operator at irregular intervals by means of a hand trip that sets the cycle member off for the completion of one revolution only, or the mechanism may be set to automatically repeat and make successive exposures at regular intervals. This becomes necessary in mapping a country over which a flight is being made so that one picture will commence where the other leaves off and when joined together will give a complete record of the continuity of the ground beneath. The frequency of the exposures made successively to this end depends upon the speed of the aeroplane in relation to the altitude, inasmuch as the view within the field of the camera changes more or less rapidly according to the altitude at a constant speed and according to the speed at a constant altitude. For this purpose I provide what I term a "frequency mechanism" adjustable at the will of the operator and interposed in the driving connections between the continually running source of motive power and the cycle member to time the intervals between which the latter is thrown into gear with its driving element.

The regulation of this frequency mechanism, the hand trip, the size of the shutter aperture and other results are effected and controlled by manually operable devices that are placed conveniently to the operator's seat whether it be close to or far from the camera through the use of flexible connections in the present form of wire cables. Two counters keep records of the exposures that have been made, one being placed for the operator's inspection and the other being photographed upon the negative so that a series of pictures are all consecutively numbered.

Referring more particularly to the drawings and to Figures 1 to 6 thereof, 1 indicates the main casing of the camera body having a tubular extension 2 at the bottom thereof and forming a main exposure chamber 3 at the top of which is a frame 4 provided with a main exposure opening 5 and a small auxiliary exposure opening 6 distinct therefrom. The upper enlarged portion 7 of the frame 1 is fitted, as shown in Figure 5, with ways 8 to receive a slidably detachable roll holder 9 having guides 10 fitting the ways 8. Below the roll holder and above the exposure openings 5 and 6 is stretched the focal plane curtain shutter indicated generally at A in Figure 5 and supported on the winding rolls B and C. The lower tubular extension 2 of the main casing 1 has threaded therein an adjustable lens tube 11 carrying the main lens mount 12 of the camera. In connection with the usual diaphragm thereof (not shown) is a toothed segment 13 with which meshes a pinion 14 carried on a shaft 15 in a bracket 16 on the extension 2. A universal joint 17 between shaft 15 and a shaft 18 terminating in a bevel gear 19 permits the diaphragm to be rotated and adjusted from a wheel 20 on the shaft of another bevel gear 21 meshing with the bevel gear 19, the said upper gearing having bearings in a bracket 21. The wheel 20 is turned from the distant control as in the making of other adjustments all as will be hereinafter described.

Associated with the main casing 1 and adjacent to but separated from the exposure chamber 3 of the camera is a dark chamber 22 formed by a box or chest 23 secured to the exterior of the casing 1 as best shown in Figures 1 and 2. The interior of the dark chamber is accessible through a door 24 hinged at 25 and at the bottom of the chamber are located a plurality of instruments 26, 27, 28 and 29; the readings of which, at the time of an exposure, are of interest in viewing the picture itself and which it is desired to photograph on a margin thereof. In the present instance, 26 is a counter; 27 a spirit level; 28 an altimeter, and 29 a compass, though a chronometer may be added to or substituted for one of these. The instruments are in the focus of a separate short focus lens carried in a tube 30 and mounting 31 at the top of the dark chamber 22 where the latter is extended through an opening 32 in the shoulder of the main casing 1 and separated from the exposure chamber 3 of the main camera by a partition 33. The lens 31 projects the image of the instruments through the exposure opening 6 onto the same film as that projected by the main lens 12 and under control of the same shutter A.

Upon each cycle of operation of the camera, the counter 26 is actuated and advanced one number by a vertical pull rod 34 pivoted to an operating arm at 35 and effective upon its upward movement. The upper end of the pull rod is pivoted at 35$^a$ to an arm 36 on a rock shaft 37. Adjacent to the latter is the contact 38 (Figures 5 and 6) of a switch in the circuit of one or more electric lamps 39 arranged in the dark chamber 22 to illuminate the instruments 26, 27, 28 and 29. Another contact member 40 on a rock arm 41 pivoted at 42 is adapted to engage contact 38 and close the circuit through the lamp as a preliminary step in each cycle of operation of the camera. This is accomplished by a pin 43 on a rock arm 44 that engages an extension 45 on the rock arm 41, the rock arm 44 being moved in a manner hereinafter described. This rock arm 44 returns to the initial dotted line position of Figure 5 immediately after throwing the switch and at the end of the cycle of operation of the camera, the rock shaft 37 is actuated in a manner also to be hereinafter described, in turn actuating the counter 26 through the pull rod 34. In accomplishing this latter function, another rock arm 46 on the shaft 37 engages and returns the contract arm 41, opening the switch and putting out the lamps 39. The contact arm 41 is burdened with sufficient frictional resistance to its movement to remain in any position to which it is rotated.

As before stated, I may use and have shown herein two types of roll holders that are interchangeable and each of which is adapted to slidably occupy the ways 8 of the upper extension 7 of the main frame. Referring first to the one shown in Figures 7, 8 and 9, this comprises a substantially rectangular casing 9 having rounded ends and containing a film supply roll 47 and a winding roll 48. The bottom of the casing contains an exposure opening 49 that may be closed to render the roll holder light-tight when removed from the camera by a sliding shutter 50 which is shown in the open position in Figures 6 and 7. This shutter is composed, in the present instance, of a thin, flexible, bronze plate, edges of which slide in guides 51 at opposite sides of the exposure opening 49 which guides are shown in section in Figure 9 to consist of two outer plates secured to the bottom of the roll holder casing and an offset inner spacing plate of about the thickness of the shutter slide. These guides 51 extend beyond the opening 49 and up into the interior of the casing 9 around one end thereof so that the shutter 50, when open, may occupy the position shown in Figure 8.

To manipulate the shutter between its open and closed positions, it is provided on its longitudinal edges just clear of the guides 51 with rack teeth 52, as shown in Figures 7 and 8 with which rack teeth mesh a pair of pinions 53 on a shaft 54 extending transversely of the casing and having bearings 55 and 56. The shaft is turned by means of a detachable hand crank 57 which appears in Figure 1 and, compared with Figures 7, 8 and 9, gives an idea of the positions of the interior parts of the roll holder relatively to the camera. The crank is turned in opposite directions to open and close the exposure opening.

The film 58 is drawn from the supply spool 47 over a guide roller 59 and across the face of a film support or backing plate 60 in the focal plane of the main camera lens 12 and thence passes over another guide roll 61 and onto the winding roll 48 through which the operating force is applied. The supply spool 47 may be of the ordinary type and as shown in Figure 7, is supported on dead centers 62 carried at the ends of spring plates 63 and 64 that may be displaced to release the spool or permit its insertion in the ordinary way. The spring plate 63 is carried at its center by a block 65 on an inner frame piece 66 connected by brace rods 67 (and also the guide rolls 59 and 61) to the front or cover plate 68 of the casing 9 so that the interior parts of the roll holder may be withdrawn as one assembly upon the said cover plate 68. A rotary bolt 70 having a bearing in the opposite wall of the casing and an operating knob 71 on the exterior has an eccentric locking portion 72 that may be rotated into and out of engagement with the plate 66 through an opening 73 therein within a cavity of the block 65. The other end of the spring plate 63 carries a winding center 74 interlocking with one end of the winding spool 48 in the ordinary manner and detachably connected by a sleeve 75 with a coupling member 76 having a bearing in the rear wall of the casing 9 and projecting to the exterior thereof for connection to power driven devices hereinafter described. The opposite end of the winding spool 48 is also similarly detachably interlocked with a winding center 77 carried in the free end of the spring plate 64, and locked to a stem 78 extending through the cover plate 68 of the casing where it terminates in an exterior hand operated knob 79 the purpose of which is to permit turning the winding roll 48 by hand for adjustments of the film such as that involved in threading the lead end upon the winding spool during loading.

The supply spool 47 is inserted or released by spreading the adjacent ends of the spring plates 63 and 64 while the winding spool 48 is manipulated in the same manner. To accommodate this movement to the hand winding stem 78, the latter has longitudinal movement in the cover plate 68 but is held in normal or engaging position by a spring 80 coiled about it and bearing at one end against the center member 77 and at the other against a felt washer 81 or similar device arranged to prevent light leaks through the bearing of the stem in the cover plate. The spring plate 64 is supported at its center on the cover plate 68 by a block 82 in which is secured the stem of an exteriorly arranged knob 83 provided as a handle for manipulating the roll holder and its guides, or the assembly of interior parts.

The brackets shown at 84 are supports for the film backing plate 60.

A fragment of the film 58 is shown in Figure 7 to contain a perforation 85 near one edge. These perforations are one picture length apart and as soon as the film has been wound through one picture area, the offset end 86 of a locking pawl or dog 87 drops into a perforation 85 permitting sufficient movement of the dog to release certain mechanism to be later referred to. The pivot 88 of the pawl or dog has a bearing in the frame piece 66 and terminates in a coupling member 89 on the exterior of the casing 9 which is adapted to be connected with the power driven parts to release the dog at proper times, as will be hereinafter described.

It is obvious that the dog 87 may be used as a film locking dog to permit the feeding of the film only at proper times but in the present construction, the primary object of perforating the film at intervals is to allow clearance for a free and extended movement of the dog not possible when it is resting on the surface of the film and for the purposes of other mechanical effects that will be explained.

The film support or backing plate 60 has a multiplicity of perforations 90 and forms one wall of a thin wind chest 91, the opposite wall of which is spaced therefrom by indented protuberances 92. A pipe 93 communicating with the interior of the wind chest runs off laterally through the rear wall of the casing 9 and makes connection with a vacuum producing means hereinafter described and functioning in timed relation to the other mechanism to hold the film flat in its focal plane during the period of exposure.

A longitudinally sliding bolt shown at 94 in Figure 1 and provided with a knob 95 secures the roll holder in operative position and also acts as a light lock, but this is not shown, and need not be described, in detail.

The alternative form of roll holder is shown in Figures 10 and 11 and similarly comprises the casing $9^a$ fitted with guiding ribs $10^a$ to occupy the ways 8 on the camera. The provision of an exposure opening $49^a$, guides $51^a$, shutter $60^a$, vacuum chest $91^a$ and locking dog $87^a$ is substantially the same with the exception that the means for operating the shutter slide 60ª consists of a winged finger-piece 96 secured to its rear end and projecting through a longitudinal slot 97 in the top of the casing. The reciprocations of this finger-piece open and close the shutter slide.

Extending longitudinally at the top of and within the roll holder and transversely across one end thereof is a curved storage or dark chamber 98 for sheets of cut film. The entrance thereto is through a slot shaped opening 99 at its lower or curved end adjacent to and just above a pair of feed rollers 100 which draw the film 58ª across the backing plate 60ᵇ of the vacuum chest from a suitably mounted supply roll 47ª and over a guide roll 59ª. Within the lower end of the storage chamber 98 is a swinging shear or knife 101 on a rock shaft 102 and adapted to swing across the opening 99 and, in connection with a lip 104, sever a film length that has been wound into the chamber 98 by the feed rolls 100. The severed film, indicated at 103, occupies the natural curved position shown and the successive cut films are pressed together by the swing of the knife which engages the topmost one behind the retaining lip 104 and by a suitable zig-zag follower spring 104ª. The end of the shaft 102 terminates outside of the casing 9ª in, or is otherwise connected to, an exterior coupling member not shown, similar to the coupling 89 which is coupled to suitable actuating mechanism hereinafter described that operates the knife at the proper time in the cycle of operation of the camera. Similarly, one of the feed rollers 100 which are geared together at 106 to turn jointly in opposite directions, is connected to a coupling member on the exterior of the roll holder casing for detachable connection with film driving mechanism hereinafter described.

The chamber 98 is an inner chamber formed by a suitably shaped container occupying an upper chamber of the roll holder constituted by a partition wall 107 that extends downwardly and longitudinally into proximity to the feed rolls 100. The said partition wall 107 extends to the exterior of the roll holder as shown in Figure 11 so that the chamber formed by it is an open chamber through the end of which, as indicated at 107ª, the container 98 may be withdrawn through the provision of a suitable handle 107ᵇ formed thereon, if desired. When the container 98 is so withdrawn to develop the contained film or substitute a fresh container, the knife 101 is swung to a position in which it closes and seals the entrance slot 99 to protect the interior of the roll holder from the entrance of light and for this purpose, the knife is provided with a felt lip 101ª. Similarly, a felt seal 102ª may be carried by the knife or its mounting on the opposite side of its shaft 102 to tightly engage the adjacent wall of the container 98 when the knife is in the intermediate position.

Turning now to the focal plane shutter previously indicated at A and its rollers at B and C, D indicates (Figure 12) the aperture thereof and the shutter is of such a nature that this aperture is moved across the field of exposure in one direction for one exposure and in the opposite direction for the next exposure. In other words, the shutter has no idle rewinding movement such as most curtain shutters have. This reversal requires the alternate use of the rollers B and C as winding rollers for effecting exposure and requires that one of them be first driven in one direction and then the other one in the opposite direction. For this purpose, I provide on the shaft of the roller C a common driving pulley or drum 108 (see also Figures 16 and 17) and this pulley is connected to a pulley 109 on the roller B by a tape 110 which is wound in opposite directions upon the two pulleys 108 and 109. Therefore, as the pulley or common operating member 108 is rotated in one direction, it winds the roller C and unwinds the roller B, while when driven in the opposite direction, it winds the roller B with a reverse action on the roller C. Associated with this operating member 108 and locked thereto are two pinions 111 and 112 which will be hereinafter referred to to show the timing of the shutter operation with relation to the general cycle of operation of the automatic controlling mechanism of the camera before I explain further the construction of the shutter itself.

This automatic controlling and driving mechanism that correlates the functionings of the various mechanisms above described is shown in Figures 19 to 30, but first referring to Figures 2, 3, and 6, I mount upon one side of the main frame 1 of the camera body by means of a bracket 113 a motor 114 turning on a vertical axis. It is preferably directly below a gear case 115 secured to one side of the upper enlarged portion 7 of the main camera casing 1 and it is against the inner side of the upper portion of this case (which projects above the focal plane of the camera) that the roll holders 9 and 9ª abut. Such inner side is the one presented to view in Figures 19, 20, and 24 and referring more particularly to these, the upper end 116 of the shaft of the motor 114 extends up into the gear case 115 through a bearing 117 where it terminates in a worm 118 supported by a bearing 119.

Figure 22:
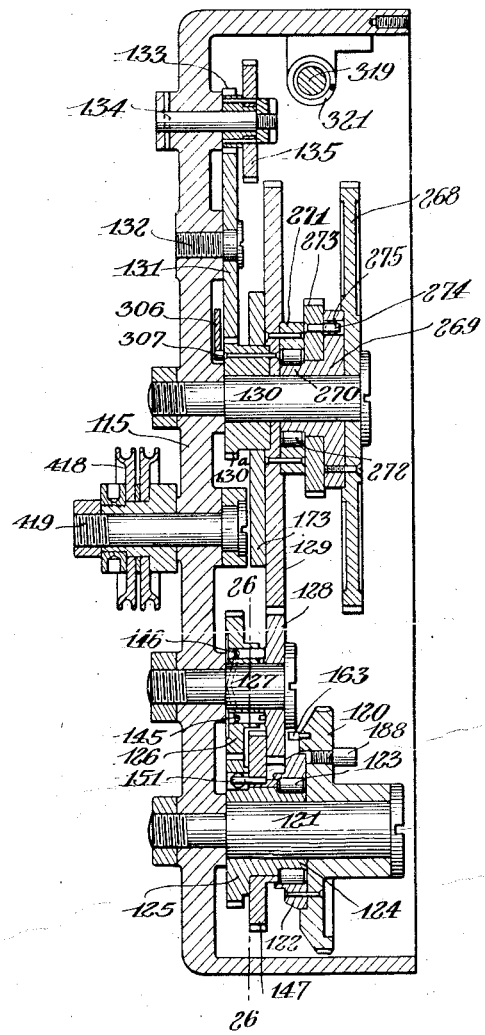
Figure 22 is a vertical section on the line 22—22 of Figure 19.

The worm 118 is continually driven at a uniform speed when the camera is in use or ready for use and meshes with a worm gear 120 on a stud 121 shown in section in Figure 22. Fixed to the gear 120 is a collar 122 having a cylindrical interior race confining a plurality of clutch rollers 123 that ride on the respective flat faces of a hexagonal hub 124 projecting within the collar and mounted independently of the gear 120 upon the stud 121. This is a familiar form of roller clutch and it will be understood that unless some force is exerted to hold the rollers 123 (see Figure 21) in the centers of the flat faces of the hexagonal hub, the rotation of the gear 120 in the direction of the arrow will jam the rollers in the narrower space at one end of the segmental cavity in which each is confined and lock the hub and collar together for concerted movement. The hub 124 is part of a pinion 125 that in turn meshes with a gear 126 on a stud 127 secured in the case 115. On the same stud 127 is a companion gear 128 driven through an overrunning clutch, hereinafter described, by the gear 126 and the gear 128 meshes with a large gear 129 on a stud 130 which large gear, with associated parts, constitutes the cycle member that controls the successive operations of the various camera mechanisms. It may be pointed out in passing that this cycle gear 129 is not the outer gear shown superposed upon it in Figure 19 but the gear disclosed by the breaking away of this outer gear in Figure 21. Bearing this fact in mind will prevent confusion in reading Figure 19.

It will be seen from the foregoing that with the clutch devices 123 left undisturbed, the continually operating driving worm 118 will rotate the cycle member 129. However, I also prefer to provide means for manually turning the cycle member so that the camera may be operated by hand. To this end there is secured to the cycle gear 129 a pinion 130ª meshing with a gear 131 on a stud 132 which gear meshes with a pinion 133 on a stud 134. The pinion 133 is fixed to a gear 135 meshing with a driving pinion 140 and the said driving pinion 140 is fixed to the shaft of a hand crank 141 on the exterior of the camera and case 115 as shown in Figures 2, 3 and 4.

Figure 26:
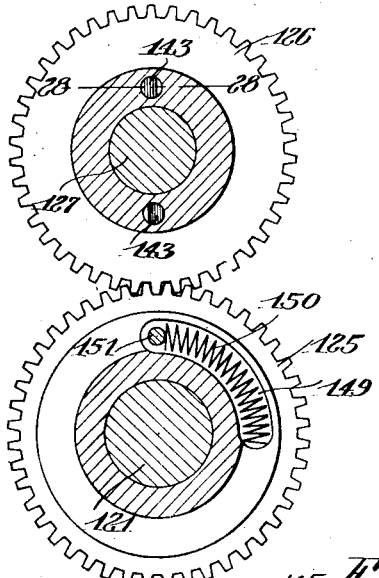
Figure 26 is an enlarged detail view of parts of certain clutch mechanism taken in section in the plane of the line 26—26 of Figure 22.
Figure 27:
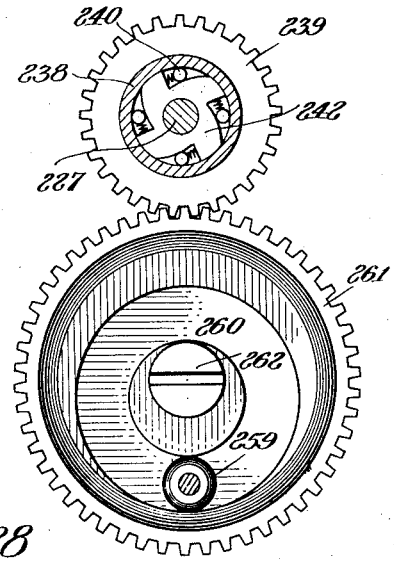
Figure 27 is a detail section through certain of the shutter driving gear parts on the line 27—27 of Figure 23.
Figure 28:
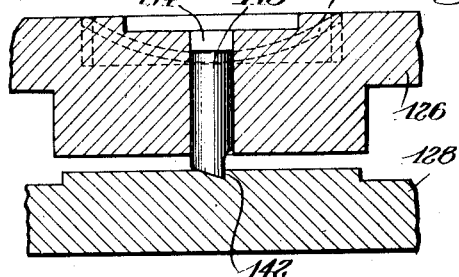
Figure 28 is an enlarged fragmentary section taken on the line 28—28 of Figure 26.
Figure 29:
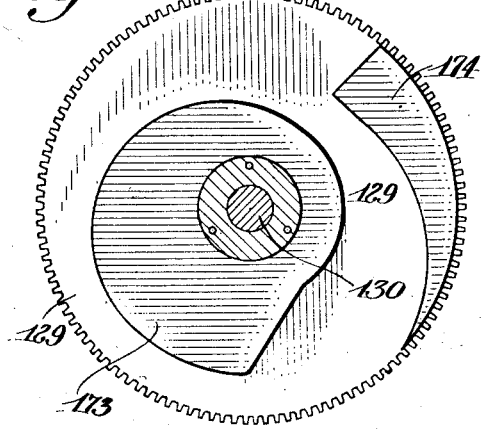
Figure 29 is a face view of the main cam of the driving mechanism.
Figure 30:
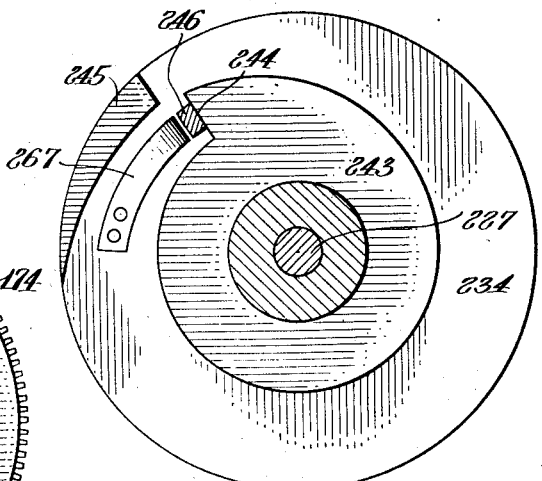
Figure 30 is a face view, enlarged, of the shutter stop cam.

In order that this hand drive may be used even while the motor drive is also connected with the cycle member 129, I interpose in the latter connection an overrunning clutch shown in Figures 22, 26 and 28 and which is, in the present instance, embodied in the driving connection between the gears 126 and 128. The latter gear carries on its rear face a plurality of ratchet abutments 142 that are engaged by ratchet pins 143ʼ projecting from the front face of the gear 126. They reciprocate in cavities 144 and are pressed toward the ratchet abutment by a convex annular spring 145 retained in the hub of gear 126 by a plate 146. It will be seen from this that if the cycle gear 129 is driven by the hand crank 141 faster than the drive communicated from the motor, the gear 128 will simply run ahead of the gear 126, the former being driven by the cycle member and the latter by the motor.

Returning to the main clutch 123 of the motor drive I will now describe how this clutch is tripped or thrown into neutral. Mounted for limited rotary movement on the hub 124 of pinion 125 is a ratchet wheel 147 (Figures 21 and 22) having a plurality of segmental annular projections 148 projecting forwardly on its hub to fit within the collar 122 of worm gear 120 and between each pair of clutch rollers 123 with which they alternate so that relative movement of the ratchet and worm will move the rollers. In the front face of pinion 125 is an annular cavity 149 (Figure 26) containing a coil spring 150 and a pin 151 projecting rearwardly from the ratchet 147 is engaged by this spring to normally urge the ratchet in a direction that will cause the projections 148 thereof to move the clutch rollers 123 into the narrow ends of their cavities and lock the worm gear 120 and the gear 125 for joint movement, the ratchet rotating with them. Obviously, therefore, if the progress of the ratchet is arrested it dislodges the rollers 123 and moves them to a disengaged or neutral position at the centers of the flat faces of the hub 124 and the worm gear 120 thereafter turns idly without driving the pinion 125 geared to the cycle member 129.

The device that I provide for thus arresting the ratchet 147 and throwing out the driving connection to the cycle member is both hand controlled and automatically controlled by the cycle member itself in a manner to be hereinafter described. It consists (Figures 21 and 32) of a stop pawl 152 pivoted at 153 and because of the fact that if, in arresting the ratchet 147 the rollers 123 shown engaged in Figure 32 are not definitely moved to a clear neutral position, they are apt to chatter or vibrate into and out of partial engagement, I construct this stop pawl 152 in a manner that causes it to not only arrest the ratchet but to give it a slight backward throw. To this end, the engaging head or tooth 154 of the pawl is slidable longitudinally of the latter on a stem 155 guided therein and urged outwardly by a plunger 156 actuated by a coil spring 157 located behind it, the spring and plunger being also guided in the longitudinal cavity in the body of the pawl. This spring contact alone has a tendency to back throw the ratchet but in addition thereto, I provide a kicker for giving the head 154 a definite outward thrust after it is engaged with the ratchet. This kicker consists, in the present instance, of a dog 158 pivoted at 159 to the body of the pawl 152 and provided on one arm with a pin 160 cooperating with a slot 161 in the stem 155 of the engaging head 154. A cam-shaped surface 162 on the other arm of the dog lies in the path of a pin 163 on the rear face of the worm gear 120. After the pawl is drawn into engagement with the ratchet within the next revolution or partial revolution of the worm gear 120, the pin 163 will come into engagement with and then slip off from the dog 158 and give the engaging head 154 a positive kick outwardly backed up by the spring 157 so that the clutch rollers 123 will be definitely cleared from their engaging positions by the projections 148 on the ratchet, and held there with the assistance of the spring 157.

Figure 19:
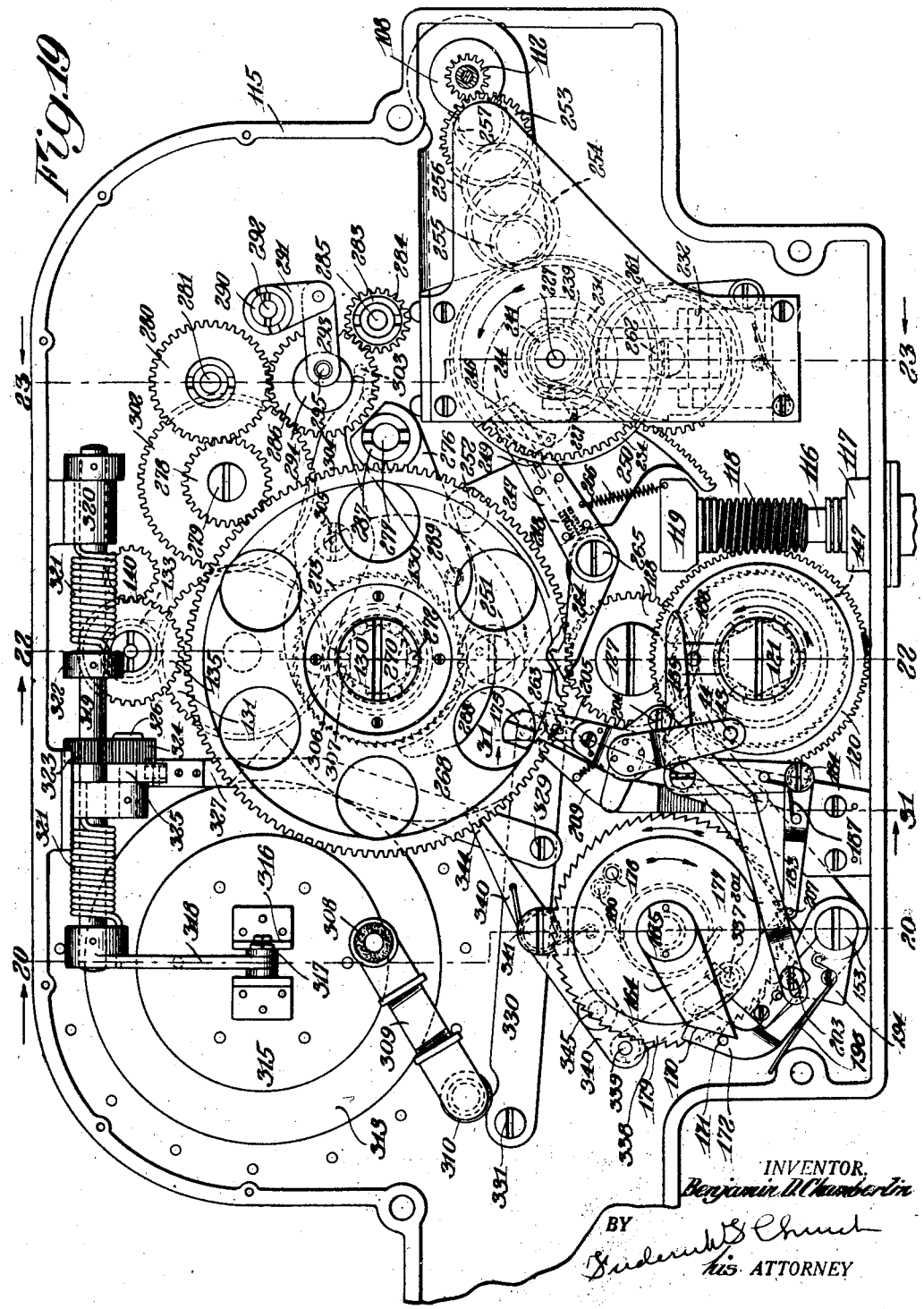
Figure 19 is an enlarged side elevation of the interior of the gear case containing the general operating and controlling mechanism, the view being one taken from the direction of the interior of the camera body.

When it is desired to trip the stop pawl 152 by hand for a single exposure and independently of any automatic features, this is accomplished by a dog 164 (Figures 20 and 21) fixed to the head 165 of a shaft 166 having a bearing in a boss 167 projecting from the wall of the case 115. To the opposite end of the shaft is secured a crank arm 168 connected by a cable 169 (Figure 34) to the distant hand control box hereinafter described. The inclined face 170 of the dog engages a pin 171 on an arm 172 rigid with the stop pawl 152 which throws the pawl out of engagement with the ratchet 147 and allows the clutch 123 to take hold. The clutch is disconnected again at the conclusion of one cycle of operation of the camera, automatically, in a manner that will be described in connection with a description of the cycle member. The cycle member or gear 129 is fitted on its rear face with a main came 173 and a marginal cam 174, an elevation of this face of the gear being shown in Figure 29. On its front or outer face it is provided with a marginal cam pin 175 (Figure 21). The normal or rest position of the cycle member is shown in Figures 19 and 21 and when a cycle of operation of the camera has been completed, this cam pin has made one complete revolution and returned to that initial position at which time it is desired to automatically throw out the main clutch 123 and disconnect the cycle member from the main driving element whether or not the main clutch has been thrown in manually or automatically. On the automatic actuation, the stop pawl 152 is thrown out to connect the clutch and thrown in to disconnect it automatically, and I will now describe the mechanism for accomplishing this and also the frequency mechanism, before referred to, which controls the length of the period between successive cycles (exposures) of the camera, or in other words, the length of the period between the disengagement and the reengagement of the stop pawl 152.

Referring more particularly to Figures 20 and 21, the shaft 166 just described in connection with the hand trip, lies within a sleeve 176 to which is secured an outer disc 177 provided with a rearwardly projecting pin or abutment 178. Turning freely on the sleeve beneath the disc is a ratchet wheel 179 provided with an upstanding pin 180. The ratchet has a normal tendency to rotate to the right under the influence of the spring 181 coiled about the boss 167 and connected to the ratchet at 182 and to the casing 115 at 183ᵃ which movement is arrested by the contact of pin 180 with pin 178 on the disc 177. Cooperating with the teeth of the ratchet wheel (see also Figure 24) to turn it to the left against the tension of spring 181 is a feed pawl 183 pivoted at 184 to the lower end of an arm of a bell crank lever 185 that is itself pivoted to the gear case at 186. The pawl is held in engagement with the ratchet by a spring 187 wound about its pivot and the bell crank 185 is vibrated to cause the pawl to feed the ratchet one tooth in counter-clockwise rotation once upon each rotation of the worm gear 120 by the engagement of a pin 188 with an arm 189 of the bell crank, the latter being returned to return the pawl 183 by a spring 185ᵃ as shown in dotted lines (Figure 21). In this way, the main driving gear that is constantly moving is always slowly feeding the ratchet 179 to the left. This causes the pin 180 sooner or later, to reach and abut against an end face 190 of the arm 172 of stop pawl 152, thereby tripping or disengaging the stop pawl and throwing in the main clutch 123 so that the cycle member 129 may be connected up and function for one revolution. The interval that will elapse before the pin 180 thus trips the stop pawl will depend, of course, upon the distance it must travel before reaching the surface 190 with the step-by-step feed of the ratchet 179 and this distance is made greater or less by the position of the pin 178 on the disc 177 that determines the resetting point of the trip pin 180 as it is returned by its spring 181. Provision is therefore made for the operator to manually adjust the position of the pin 178 through the rotation of the disc 177 and to this end (referring to Figures 20 and 34) sleeve 176 carrying the disc 177 has fixed to it a pulley 191 over which passes a cable 192 running to the distant control box hereinafter described. As the disc 177 is rotated by means of this pulley, the stop pin 178 may be placed at any desired point in the circumferential path of the trip pin 180 through an angle of about 350°.

Figure 24:
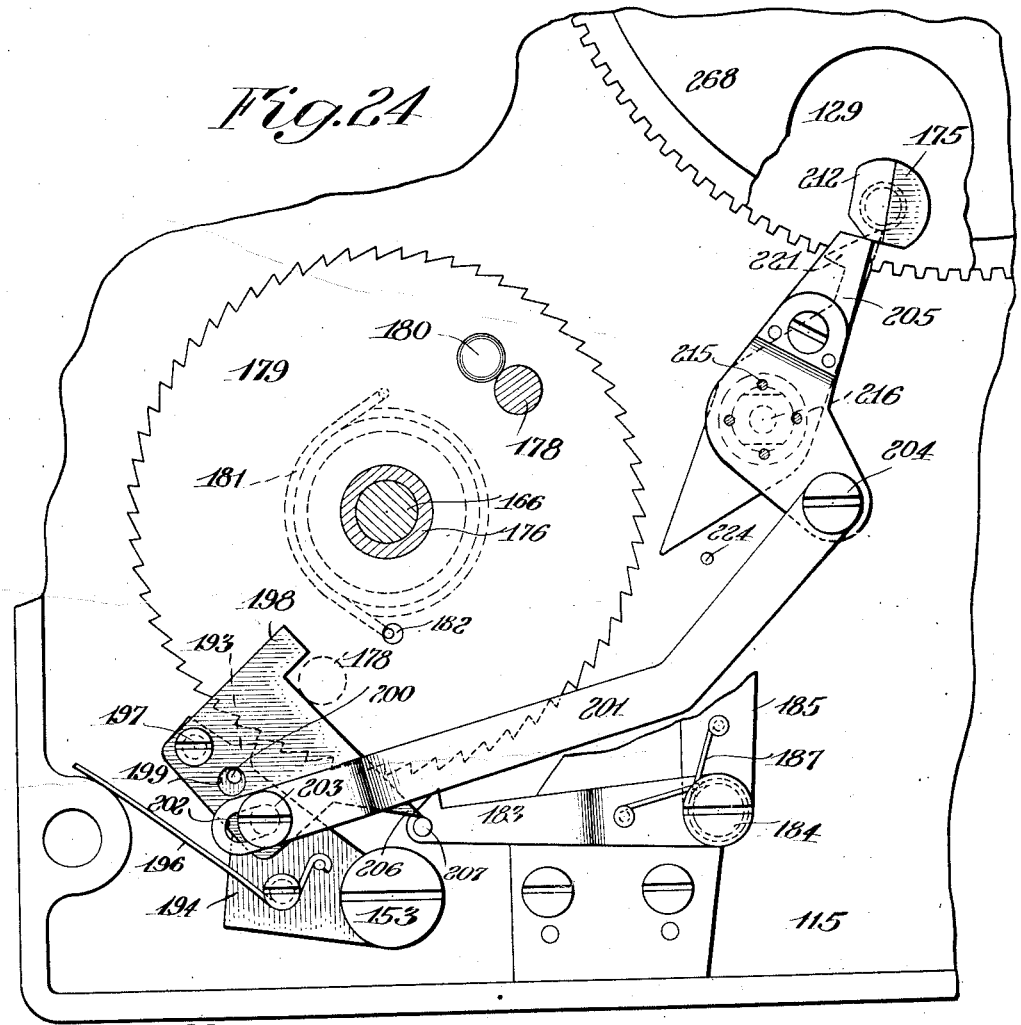
Figure 24 is a fragmentary elevation of the driving and tripping devices of the frequencing mechanism shown in Figures 19 and 21 but stripped of intervening parts.

After this pin 180 has tripped the stop pawl 152 and thrown in the main clutch, it is re-set almost immediately in the following manner:

The feeding mechanism of this frequency mechanism includes not only the feed pawl 183 but a holding pawl 193 (Figure 24)

which is part of a plate 194 pivoted at 153 to the case and normally held in engagement with the ratchet 179 by a spring 196. Pivoted to the plate 194 at 197 is a plate 198 having an opening 199 through which projects the pin 200 on the plate 194. A link 201 has a slotted connection 202 with a pin 203 on the plate 198. The opposite end of this link 201 is pivoted at 204 to an arm of a bell crank lever 205, the end face of the other arm of which is in the path of the cam pin 175 on the cycle member 129.

When the cycle member is thrown into gear through the pin 180, tripping the stop pawl 152 of the main clutch, or otherwise, one of the first things it accomplishes is to vibrate this bell crank lever 205, as shown in Figure 24. Through the link 201, it rocks the plate 198 on its pivot 197 and an arm 206 on the plate thereupon engages a pin 207 on the feed pawl 183 and moves it to the inoperative position shown. At about the same time the plate 198 acts upon pin 200 on the plate 194 also rocking the holding pawl 193 out of engagement with the ratchet. The latter, being unrestrained, reverses in a clockwise direction under the influence of its spring 181 and carries the trip pin 180 immediately back to engagement with the adjusting pin 178 in whatever position it may be. The contact of the cam pin 175 on the cycle member with the bell crank 205 is only momentary and is immediately released as it does not take long for the pin 180 to return to set position and thereafter the pawls of the driving gear of the ratchet 179 of the frequency mechanism go back into engagement and the feeding for another tripping of the main clutch through the travel of pin 180 begins to again progress.

Incidentally, it will be noted that by hand adjusting the setting pin 178 on the disc 177 to an extreme position shown in dotted lines in Figure 24, it is made to perform the added function of manually throwing out the feed pawl mechanism of the frequency device and the operator makes this adjustment preparatory to using the hand drive (crank 141) of the camera in order that the main clutch 123 may be exclusively under the control of the hand trip dog 164 and not be interrupted by an ill-timed automatic actuation through the trip pin 180.

The last function accomplished by the cycle member 129 upon completing its one revolution is to shut itself off from its source of driving power by throwing in the stop pawl 152 and disconnecting the main clutch 123. This is effected by the pin cam 175 engaging the inclined end face 208 of a link 209, the lower end of which is pivoted at 210 (Figures 21 and 32) to the body of stop pawl 152. The link 209 has a free longitudinal movement being crooked about the pivot of the bell crank 205 against which it is held by a spring 211. The pin cam 175 is notched or cut away at 212 so that after the link 209 has been actuated and the cycle member halted, the link will be in position to clear the pin cam upon the disengagement of the stop pawl 152 by the tripping devices heretofore described.

In order that the stop pawl 152 may be yieldingly maintained in either the engaged or disengaged position in which it is left by one or the other of its actuating devices, I provide the spring detent 213 best shown in Figures 32 and 33. This consists of a flanged leaf spring secured to the case with its end adapted to lock behind the conical head of a pin 214 on the rear face of the pawl 152. This detent will support the pawl itself, but its action is overcome by the pawl actuating devices.

Secured to the bell crank lever 205 of the tripping element for the driving device of the frequency mechanism shown in Figure 24 is an arm 44 (Figure 21) carrying pin 43 heretofore described in connection with Figure 5 as the arm that actuates the light switch for the instrument chamber 22 and it will now be seen why these lights are turned on as one of the first steps in the cycle of operation because it has just been explained that the first thing that the pin cam 175 of the cycle member does is to rock this bell crank 205. Pins 215 secure lever 44 to the bell crank 205.

Figure 25:
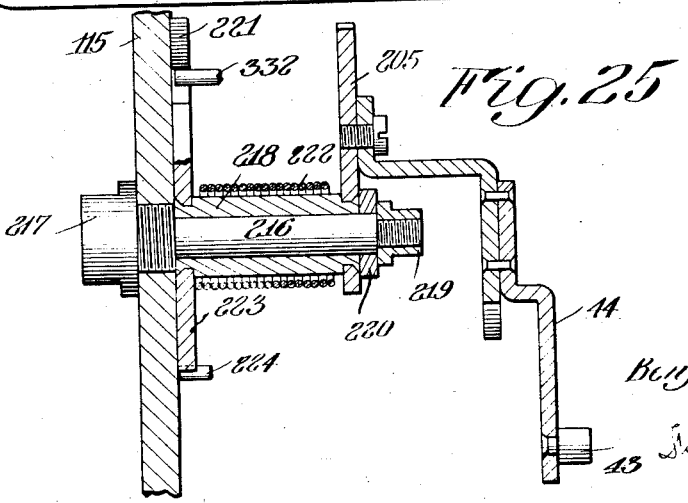
Figure 25 is an enlarged fragmentary section of the main trip lever and its pivot, taken substantially on the line 25—25 of Figure 21.

The pivoting of this bell crank lever 205 and hence of the arm 44 is a somewhat peculiar arrangement but will be understood from an inspection of Figure 25. Turning on the stud 216 threaded into the case 115 and locked by a nut 217 is a sleeve 218 turning beneath a nut 219 and washer 220. Riveted on the outer end thereof is the bell crank 205 while similarly secured on the inner end is a hook latch 221 to be hereinafter referred to. A spring 222 coiled about the sleeve 218 and having one end anchored to the case has its other end connected to rotate the bell crank 205 to the left in the figures, a tail 223 on the latch 221 which is flat against the case cooperating with a stop pin 224 on the latter to maintain the pivoted parts in the normal positions of Figure 21.

Figure 23:
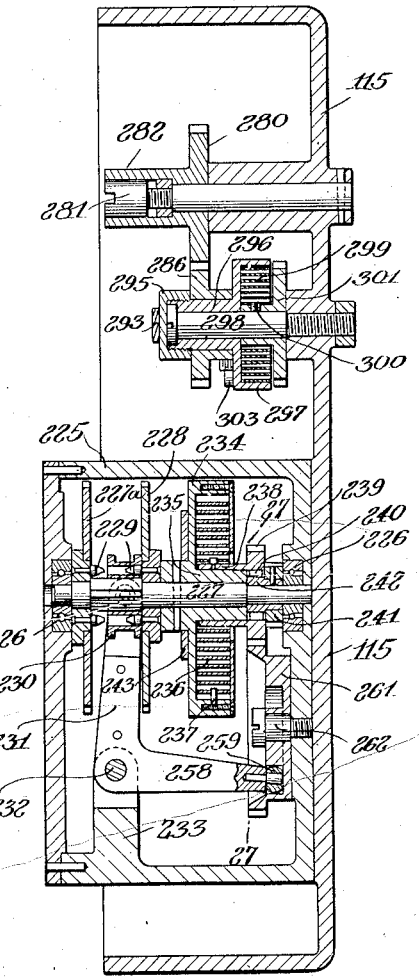
Figure 23 is another vertical section on the line 23—23 of Figure 19, looking in the direction of the arrow.

Recalling the fact that the common operating member or pulley 108 (Figure 16) for driving the shutter rollers B and C alternately in opposite directions has associated with it for this purpose, two pinions 111 and 112, it will be observed that the pinion 112 and the pulley 108 are shown in elevation at the right of Figure 19, the section being through the pulley shaft and I will now describe the driving and reversing mechanism for the shutter pulley and its relationship to the cycle member 129. Referring also to Figure 23, there is secured to and within the case 115 a smaller gear case 225 in which is journaled in roller bearings 226 a shaft 227. Turning independently on this shaft are two loose gears 227ª and 228 provided on their proximate faces with clutch pins 229. A clutch collar 230 keyed to the shaft may be shifted into alternative engagement with these pins to lock one of the gears for rotation with the shaft by a bell crank shipper 231 pivoted at 232 to a bracket 233 in the casing. Also mounted on the shaft is a spring case 234 having its hub 235 pinned thereto. A clock spring 236 within the case has its outer end anchored thereto at 237 and its inner end anchored to a hub 238 on a pinion 239 connected by a one-way roller clutch 240 to the hub 242 of a pinion 241 which clutch is of the familiar type used in photography to prevent the back wind of film rolls and is for the purpose of locking pinions 239 and 241 together for joint movement in only one direction. It is shown enlarged in Figure 27.

On the outer face of spring case 234 is secured a plate 243 provided with a stop shoulder 244 (Figure 30) and the case is also provided opposite the region of the stop shoulder with a marginal cam 245. This stop shoulder is engaged by the angularly turned head 246 of a stop pawl 247 (Figure 19) in which the stem of the head 244 is guided and cushioned against a spring 248 to absorb the shock of impact, the projecting movement of the head being limited by a pin 249 working in a slot in the pawl.

The case being thus normally held against movement, the clock spring 236 is wound from its center by the hub of the pinion 239 through the one-way clutch 240 and the pinion 241. For this purpose the pinion 241 meshes with a segment lever 250 (Figure 19) pivoted at 251 to the case and carrying a roller 252. This roller is engaged for setting movement of the sector and pinion 241 by the marginal cam 174 on the under face of the cycle member 129 previously described (Figure 29) and is actuated by the main cam 173 on such cycle member at a later point in the revolution of the latter. During this return movement, the one-way clutch 240 permits the pinion 241 to idle during its reverse movement and to be disconnected from pinion 239 and the rest of the spring winding mechanism which spring winding mechanism all turns freely on the shaft 227.

The pinion 112 of the shutter roll operating pulley 108 is geared to the gear 227ª through a train of two intermediate gears 253 and 254 shown in dotted lines in Figure 19, whereas the other pinion 111 is adapted to be driven from the companion gear 228 through a train of three intermediate gears 255, 256, and 257. These trains having unequal numbers of gears will hence drive the shutter operating pulley 108 in opposite directions though the spring driven gears 227ª and 228 both turn in the same direction with the spring driven movement of shaft 227. Therefore, assuming that clutch 230 is in the position of Figure 23 connecting up gear 228, when the spring is released shutter pulley 108 will be driven to the left in Figure 19, but when the clutch is shifted, it will be driven to the right from gear 227ª on to pinion 112.

The said clutch is shifted automatically after each actuation of the shutter and its spring driving mechanism by that mechanism itself. To this end (Figures 23 and 27) an arm 258 on the bell crank shipper 231 is provided with a roller 259 traveling in an eccentric cam track 260 in the face of a gear 261 mounted on a stud 262 in the casing. This gear meshes and is driven intermittently in one direction by pinion 239 upon each driving revolution by the clock spring 236 upon which revolution gear 261 makes a half revolution and carries the roller 259 from the high to the low point of the cam, or vice versa, thereby alternately connecting up gears 227 and 228 and reversing the shutter through its operating pulley 108 on successive operations.

The clock spring motor of the shutter drive is tripped by the cycle member 129 during the early part of its cycle and rewound through the segment 250 as just described during the latter part in preparation for the subsequent cycle. The tripping is accomplished by the cam pin 175 engaging the cam face 263 of a trip arm 264 rigid with the stop pawl 247 and pivoted at 265. When this occurs, the head 244 of the stop pawl is rocked radially out of engagement with the shoulder 246 on the spring motor case and the latter allowed to make its single driving rotation, at the end of which the head 244 (Figure 30) is moved inwardly back into the path of shoulder 244 by the marginal cam 245 and the motor again halted inasmuch as the stop pin 175 of the cycle member has by that time passed beyond the trip arm 264 and a spring 266 holds the stop pawl in engaged position. Furthermore, when the stop arm 247 goes into engagement with the shoulder 244 it rides over a latch spring 267 (Figure 30) which prevents any rebound on the part of the shutter motor mechanism.

I will next describe the film winding mechanisms in their relation to the cycle member and referring more particularly to Figures 19 and 22, there is also mounted on the upper or outer end of the stud 130 so as to appear superposed upon the cycle member 129 in Figure 19, a gear 268 to which is secured a hub 269 terminating in a hexagonal portion 270 arranged within a hub collar 271 on the cycle member 129. Clutch rollers 272 ride on these squared faces and lock the gear 268 to the cycle gear 129 in exactly the same manner as that previously described with respect to the main clutch 123. There is similarly provided a ratchet 273 turning on the hub 269 and having a pin 274 engaged by a spring 275 within an annular segmental recess of the hub 269 to normally hold the clutch elements in engagement while projections on the ratchet, interspersed between the clutch rollers, unseat them when the rotation of the ratchet is halted. The ratchet is so arrested by a stop pawl 276 pivoted at 277.

The gear 268 through a pinion 278 on a stud 279 drives a gear 280 on a stud 281 and, as shown in Figure 23, this gear 280 has a hub 282 terminating in a coupling adapted to cooperate with the projecting drive receiving coupling 76 of the continuous film roll holders shown in Figures 7, 8 and 9. Therefore, while the clutch 272 is in, the cycle member will tend to wind the film of this roll holder. Similarly, it will tend to wind the film of the cut film roll holder shown in Figures 10 and 11, if that is the one that is in use, for the drive receiving coupling 105 of the latter is received by a coupling member 283 on the hub of a gear 284 mounted on a stud 285 and driven from the gear 280 through an idler 286.

In either case the film drive or winding action is relatively short and must be terminated after an exposed area of film has been wound out of the field of exposure and a new sensitive area wound in. In this connection it will be recalled from the previous description that a film locking dog 87 or 87ª is used to cooperate with the perforations in the film at the ends of each exposure area. The coupling member 89 of this dog, which is positioned the same in both roll holders, interlocks with a coupling member 287 on the hub of the stop pawl 276 of the controlling ratchet 273 for cycle clutch 272. Therefore, when the film dog 87 or 87ª falls into a perforation of the film at the end of a picture area that has been fully wound off, it rocks the stop pawl 276 into engagement with the ratchet, as shown in Figure 19; disconnects the large film driving gear 268 from the cycle member and the film feed is terminated automatically for the time being.

The film dog is disengaged from or lifted out of the film perforation when the film winding operation is to be started by a cam plate 288 on the outer face of the cycle member 129, the full contour of which cam is shown in dotted lines in Figure 19. This cam rides beneath a pin 289 on the stop pawl 276 and lifts the latter out of engagement with the clutch controlling ratchet wheel 273 whereby the film is unlocked and the clutch of the film winding gear 268 thrown in simultaneously. By the time the film locking dog reaches the next perforation, the cam 288 has passed the pawl which is free to be actuated back by the film dog.

In case the cut film roll holder of Figures 10 and 11 is in use, the knife 101 thereof must be connected up to sever the film at the proper time. For this purpose, the coupling member of the knife automatically interlocks, when the roll holder is applied, with a coupling member 290 of a rock arm 291 (Figure 19) pivoted at 292. A connecting rod 293 is adapted to rock this arm once to operate the knife 101 and then return it upon each revolution of a disc 294 carrying a wrist pin 295 on which the connecting rod turns. Referring to Figure 23, the said disc 294 is secured to the hub 296 of a spring motor casing 297 turning on a stud 298 secured in the gear case 115 and it may be here explained that for convenience, the transmission gear 286 of the film winding devices is mounted to turn idly on this hub 296. A clock spring 299 is enclosed within the case 297 with its outer end locked thereto and its inner end anchored at 300 to the hub of a pinion 301 so that the spring may be wound from its center and drive the disc 295 from its periphery.

Upon each revolution of the cycle member 129, this motor winding pinion 301 is driven one revolution from pinion 130 (Figure 22) secured to the cycle member 129, heretofore described in connection with the hand drive, and through another transmission gear 302 turning on the stud 279. When the motor has been thus wound, a stop pin 303 on the outer side of the motor case is locked by a stop arm 304 pivoted at 305 and having its opposite cam-shaped end 306 in a position to be tripped by a pin abutment 307 shown in dotted lines in Figure 19 and in section in Figure 22 on the under face of the cycle member. During the rotary course of the latter, the cut-off motor is thus tripped and then immediately rewound in preparation for the next cycle.

As the application of the vacuum to the rear of the film must precede the exposure, this is the first function performed by the cycle member but it is accomplished after the cycle member has stored energy in a vacuum producing motor on its previous cycle and I will therefore describe the winding operation first in connection with the description of the vacuum producing mechanism itself.

The air pipe 93 of the vacuum chest 91 or 91ª of either roll holder projecting from the side thereof, as shown in Figure 7, is coupled up, when the roller holder is applied to the camera, with a rubber union 308 (Figure 19) on a pipe 309 that communicates at 310 through the case 115 with a pump chamber 311 (Figure 20) formed by a supplemental case 312 (Figure 3) secured to the exterior of the main gear case 115. The pump is of the diaphragm type and the flexible leather or other diaphragm 313 is secured at its margins by the screws 314 between the two casings, while its center is reenforced by rigid plates 315 connected by bracket bearings 316 and a link 317 to the end of a rock arm 318. This rock arm 318 is carried fixed to a shaft 319 that rocks in bearings 320 extending from the top wall of the case 115 and springs 321 coiled about the shaft tend to raise the rock arm 318 from the position of the figures and produce a vacuum in the pump chamber 311 and hence in the vacuum chest 91 in rear of the film. One of the springs 321 is connected to a shaft bearing and to the arm 318 and the other to the other shaft bearing and to a collar 322 fixed on the shaft. There is also fixed to the shaft a pinion 323 meshing with a pinion 324 that is fixed to a rock arm 325 turning on a stud 326 so that as this rock arm 325 moves downwardly in the figures, the springs 321 are wound or placed under tension and the diaphragm 313 is collapsed to the position of Figure 20. This winding movement is produced by a pull rod 327 pivoted at its upper end at 328 to the said rock arm 325 and at its lower end at 329 to a lever 330 of the second order having its fulcrum 331 on the case 115. The opposite end of the lever is fitted with a catch pin 332 best shown in Figure 21 which is automatically engaged by the latch 221 (see also Figure 25) heretofore described, when the lever 330 is depressed to hold the spring motor under tension. The lever is so depressed by the main cam 173 on the cycle member 129 at the conclusion of a cycle, said cam engaging another setting pin or roller 333 on the lever 330.

I arrange to have the vacuum or the atmospheric pressure on the film released before the film is fed after an exposure but I find that a positive releasing device is not required inasmuch as the natural leakage with the construction shown is sufficient to destroy the vacuum before the film starts to move.

Inasmuch as the first thing the cycle member does upon starting its cycle is, through its pin cam 175, to rock the bell crank 205 as shown in Figure 24, it will be seen from Figure 25 that the latch 221 is operated with it to disengage the pin 332 and release the lever 330, allowing the motor springs 321 to raise the diaphragm and exhaust the vacuum chamber 311.

Referring to Figures 6, 20, and 34, (it being borne in mind that the latter is directionally reversed with respect to Figures 19 and 21), the shaft 166 on which the hand trip lever 168 is secured, carries, to turn freely thereon between said lever 168 and pulley 191, an arm 334, having two branches to one of which is connected a cable 335 running to the counter on the distant hand control box previously referred to and hereinafter described. The other branch carries a pivot 336 running through a slot 337 in the case 115, shown in dotted lines in Figures 19 and 21 and connected to a link 338, the other end of which is pivoted at 339 to a lever 340 pivoted at 341 to a bracket 342 and actuated by a spring 343 to the normal position shown in the figures referred to. A tip 344 of this lever lies in the path of the pin cam 175 of the cycle member 129 and one of the last things the latter accomplishes is to vibrate this lever, pulling up on the link 338 and actuating the arm 334 to pull the counter cable 335. The lever 340 also carries a pin 345 which is the one shown in Figure 5 engaging a bifurcation in a lever 346 secured to and adapted to rock the rock shaft 37 and actuate the pull rod of the counter 26 in the dark chamber 22 as hereinbefore described. As the lever 340 is vibrated upon each cycle and is connected to both counters it registers each exposure simultaneously on the two counters.

I will now briefly review and give the sequence of the functions of the cycle member performed during one complete cycle, reference being had particularly to Figures 19, 21, and 24. The parts being normally in the positions of Figures 19 and 21 when the stop pawl 152 is disengaged, the main clutch 123 is thrown in and the cycle member 129 placed in gear to rotate in a counter clockwise direction. It immediately accomplishes three things substantially simultaneously: By engaging the end of the bell crank 205, the pin cam 175 rocks that lever and its associated arms turning on the lamps 39 (Figure 5) through arm 44 and pin 43; actuating the vacuum producing means by releasing hook 221 from pin 332 and throwing out the operating pawls of the frequency ratchet 179, allowing the latter to re-set. The pin cam 175 next engages arm 264 tripping the shutter mechanism by withdrawing stop arm 247 and the exposure is made. The cam 288 on the cycle member next places the film winding devices in gear by engaging the pin 289 and lifting out the stop pawl 276 from the clutch ratchet 273 which in turn lifts the film locking dog 87 or 87ª from the film perforation and unlocks the film. The film dog, dropping into the succeeding perforation, throws out the film winding clutch 272 by restoring the stop pawl 276 after the cam 288 has passed. The main cam 173 now engages the roller 333 on lever 330 and rewinds the vacuum motor. By this time, the marginal cam 174 of the cycle member has reached the roller 252 of the winding segment 250 of the shutter motor and set the segment, the segment running idly because of the clutch 240. The main cam 173 then actuates the segment through engagement with roller 252 and winds the shutter motor. In the meantime, the pin cam 175 has reached the tip 344 of lever 340 actuating both the distant control counter and the counter 26 in dark chamber 22 at the same time kicking off the lamp switch arm 41 through the arm 46 of the counter mechanism. At this point the re-winding of the film has wound the spring motor of the film cut-off device which is the only motor of the kind that is normally run down and is wound during the same cycle upon which it is tripped. Toward the end of the cycle, the pin 307 on the cycle member trips the lever 304 and releases the motor which drives the trip 294 one revolution and cuts the film in case the cut film roll holder is in use. The final function of the cycle member is to engage the cam end 208 of the link 209 and throw the stop pawl 152 into engagement with the main clutch ratchet 147, disconnecting the main clutch 123 and bringing the cycle member to a halt. The end 208 of the link 209 is above the corresponding end of the bell crank 205 and opposite the notch 212 in the cam pin 175, so that, though left in the position of Figure 21, it clears the cam pin when the stop pawl 152 is released immediately upon the start of the cycle member on its next cycle.

Referring now to the details of construction of the particular focal plane curtain shutter that I prefer to use and which is illustrated in Figures 12 to 18 inclusive, the shutter operating pulley 108 and its associated gears 111 and 112 are fixed to a sleeve 347 turning in a bushing 348 in a shutter frame 349 (Figure 16). The sleeve is shown integral with a pulley 350 at one end of the roller indicated generally at C and this pulley is rigidly connected through an inner sleeve 351 and a tube 352 fastened thereto with a similar pulley 353 having a ball bearing 354 on a cone 355 carried in the frame 349 at the other end of roller C. These pulleys 350 and 353 take the winding tapes 356 of the curtain 357 that is wound on roller B. Hence when the operating pulley 108 is turned in one direction, it winds these tapes and draws the curtain 357 from the opposite roll across the exposure opening, maintaining the aperture D between it and the other curtain 358 which curtain is being wound upon roller C in the manner I will now describe.

A curtain winding drum or shell 359 of roller C is mounted at its end upon tape pulleys 350 and 353 to turn relatively thereto but during the actuation of the shutter just described, the shell and pulleys turn together so that curtain 358 is wound at the same rate as tapes 356 of curtain 357 to maintain the aperture D. The purpose of the relative movement of shell 359 is to vary the size of the aperture D by winding curtain 358 away from curtain 357 while the tape pulleys 350—353 of the latter remain stationary. To this end, there is secured to the inside of shell 359 a tube 360 having longitudinal slots 361 therein. The sleeve 351 within this tube is provided with a spiral cam slot 362 and within the said sleeve is a cross head 363 provided with independent rollers engaging both the spiral slot 362 in the one member and the straight slot 361 in the other. It will be seen therefore that when the cross head is moved longitudinally of the roll, it will turn the shell 359 and the sleeve 351 relatively and hence the shell and the pulleys 350—353 relatively, so that the curtain 358 and the tapes 356 of curtain 357 will move in opposite directions, widening or narrowing shutter aperture D according to the direction of movement of the cross head.

To adjust the latter, it is carried upon a longitudinally movable shaft 364 extending through the sleeve 347 of pulley 108 and having a roller bearing 365 in another cross head 366 (Figure 17). This last mentioned cross head has a roller portion 367 operating in a straight longitudinal slot 368 in a tube 369 attached by a collar 370 to a fixed part 371 of the framework. Surrounding this tube 369 is a relatively movable sleeve 372 on the hub 373 of a pulley 374 fixed to a shaft 375. The said shaft has roller bearings 376 in a stationary frame bracket 377 and a roller bearing 378 in the end of fixed tube 369. The sleeve 372 may therefore be turned by pulley 374 over which runs a cable 379 running to the distant hand control hereinafter described. On the interior of sleeve 372 is a spiral cam track or thread 380 which is engaged by another set of pulleys 381 on cross head 366 whereby, through this pulley adjusting device and the cross head 366, the shaft 364 may be screwed up and down longitudinally within the roll C and cause the other cross head 363 to rotate relatively the curtain shell 359 and the tape pulleys 350—353, converting by a simple mechanism rotary motion into rectilinear motion and then back into rotary motion to transmit power through the axis of the roll.

Turning now to roll B, I provide means on this roll for holding both curtains under tension to maintain the aperture D accurate at all times. For this purpose, the tape pulley 109 is mounted on a shaft 382 running through a bushing 383 in frame 349 where it has a roller bearing 384 and is secured in a core piece 385 rigidly connected by a tube 386 to another core piece 387 having a roller bearing 388 on a cone 389 in the opposite end of the frame so that there is, in effect, a continuous shaft or member running straight through the center of roll B B. Turning freely thereon at opposite ends are tape pulleys 390 for the tapes 391 of curtain 358. Also turning relatively to the shaft and to the pulleys 390 on which it is mounted at its ends is a curtain winding shell 392. Sleeves 393 secured to this shell turn on the tube 386 while the shell turns freely on collars 394 secured to the tube 386. Two springs 395 coiled about the central shaft member have their ends respectively connected to collars 394 and to the respective tape pulleys 390 so that the latter are placed under tension tending to wind the tapes of curtain 358. A spring 396 at the center encircling tube 386 has its ends respectively connected to the sleeve 393 of shell 392 and to a collar 397 on tube 386 so that the curtain shell 392 has also a tendency to wind the curtain independently of the tape pulleys and hold it taut. Therefore, when the shutter as a whole is moving toward roll B, the operating pulley 109 is winding the tapes of one curtain and the body of the other curtain through springs that hold them both taut, while with the curtain moving in the opposite direction the same tension is exerted in unwinding both from roll B.

The distant hand control box from which all of the adjustments aid manual operations of the shutter parts hereinabove described are transmitted is shown in detail in Figures 35 and 36 and it may be mounted in any position, vertically or horizontally, where it may be conveniently reached from the operator's seat in the aeroplane. It consists of a casing 396 having at one end a plurality of couplings 397 for a plurality of conduits or flexible tubular casings through which flexible cables pass from the interior of the box to a casing 398 secured on the exterior of the gear case 115, as shown in Figures 3 and 34. This casing 398 is similarly provided with a plurality of couplings 399 to receive the wires and conduits as they pass in for attachment to the parts to be controlled. It will again be borne in mind that the casing 398 in Figures 3 and 34 is directionally reversed with respect to such figures as Figure 19 which show the interior of the case 115 from the other side.

Within the control box 396 is an electric switch indicated generally at 400 of any desired construction operated by a knob 401 to control the motor 114, the wires passing out of the box at 402. At one end, a lever pivoted at 403 has a projecting finger portion 404 that may be pinched against a fixed thumb piece 405 to draw upon the cable 169 that runs to the hand trip arm 168 (Figure 20) of the main clutch. A counter or register 407 re-set by the winged knob 408 and located at the opposite end of the box 396 is actuated by a cable 335 running from the lever 334. This counter may be of any desired construction and the details are not of moment here. Near the center of the control box is an internal boss 409 forming a bearing for a shaft 410 terminating on the exterior in a handle 411 and having secured to its inner end a pulley 412. Over this pulley runs a cable 413 that emerges from the box at 414 and 415 running into the case 398 at 416 and 417, over a double idler 418 turning on a stud 419 and thence around pulley 374 (Figure 16) so that the shutter aperture control may be turned in both directions. Associated with the handle 411 is a thumb release bell crank latch 420 pivoted at 421 and provided with a spring 422 to normally lock its engaging pin 423 in one of a series of circularly arranged apertures 424 in a scale plate 425. These apertures or stops have an accompanying scale (not shown) appropriately marked in terms of desired widths of the aperture D.

Also projecting from the case and terminating in a similar handle 426 provided with a similar bell crank latch 427 co-operating with stop apertures 428 on a disc 429 supported from an ear 430 is a shaft 431 on the extreme inner end of which within the case 396 is a pulley 431ª around which passes a cable 432 running out of the control box at 433 and 434 and thence to pulley 20 (Figure 6) of the diaphragm controlling mechanism to turn the latter in either direction. The shaft 431 turns in a sleeve 435 having a bearing in the case 396 to the outer end of which sleeve is secured a crank arm 436 having a handle portion 437 pivoted to the arm at 438. A finger 439 on the handle portion is pressed by a spring 440 to throw an engaging portion 441 of the handle portion selectively into notches 438 of a fixed disc 439ª on the exterior of the case. These notches 438 are graduated in terms of exposure frequency and the position of the crank is registered through an opening 442 in the disc 429 by numerals or suitable characters arranged on a disc 443 secured to the sleeve 435 and crank 436 and turning with the latter between discs 429 and 439. For instance, the reading illustrated in Figure 35 may indicate 21 exposures to the minute or the period between exposures and by consulting a chart on which the altitude and speed of the aeroplane are correlated in conjunction with this system of frequency numerals, the crank 436 may be set to give the required number of exposures per minute for a continuous sequential photographic record of the ground beneath, or other desired result.

The inner end of the sleeve 435 to which the crank handle is connected has fixed thereto a pulley 444 over which runs a cable 445 leading out of the control box at 446 and 447 and running to pulley 191 (Figures 20 and 34) of the frequency disc 177 so that it may be turned in both directions. In order to give sufficient amplitude to the movement of the shutter controlling cable 413, it is passed over idlers 446 and 447 that turn loosely on the hub of the frequency pulley 444 though it is difficult to trace these cables exactly on Figures 35 and 36.

It will thus be seen that all of the adjustments and controls necessary for the various operations of the camera that have been described may be manually conducted from this one control box 396.

In Figures 1 to 5 is shown a light-filter mechanism which I find it convenient and desirable to employ. It consists, in the present instance, of an annular filter frame 448 containing a suitable colored glass (not shown) and pivoted at 449 to the ends of two rock arms 450 pivoted at 451 to the lens tube 2 in any suitable manner. Also secured by a bracket 452 to the lens tube 2 is a curved guide 453 having segmental ways 454 in its sides. Slidable in these ways are pins 455 on the frame 448 and their relation and that of the ways to the pivot 449 and the pivot 451 is such that raising the arms 450 from the position of Figure 2 will cause the filter frame 448 to swing out of the position shown covering the end of the lens tube, to a vertical position and to then be drawn up parallel with the lens tube at the side of the guide 453. This is done when it is desired to render the filter inoperative and the movement is accomplished by a link 456 pivotally attached to the arm 450 at 457 and connecting the latter to a draw bar 458 to which the link 456 is pivoted at 459. The draw bar is guided in straps or brackets 460 and 461 carried on the body of the camera or one of the cases and terminates in a hooked handle 462 to be conveniently grasped by the operator in raising or lowering it.

I claim as my invention:

1. In an aerial camera, the combination with a camera body having a plurality of attached mechanisms for performing operations incident to automatically exposing successive sensitive surfaces, continuously operating driving means, a cycle member driven thereby to successively cooperate with the said mechanisms, and a roller clutch between the driving means and cycle member, said clutch embodying a ratchet wheel as a shifting medium, of a stop pawl adapted to cooperate with the ratchet wheel to halt the same and disengage the rolls, said pawl being provided with an extensible engaging head and with a kicker for momentarily projecting the head to slightly reverse the ratchet when halted, and a device on the driving means for operating the kicker.

2. In an aerial camera, the combination with a camera body having a plurality of attached mechanisms for performing operations incident to automatically exposing successive sensitive surfaces, continuously operating driving means, a cycle member driven thereby to successively cooperate with the said mechanisms and a roller clutch between the driving means and cycle member, said clutch embodying a ratchet wheel as a shifting medium, of a stop pawl adapted to cooperate with the ratchet wheel to halt the same and disengage the rolls, said pawl being provided with a spring pressed engaging head for the purposes set forth and with a pivoted kicker for momentarily projecting the head to slightly reverse the ratchet when halted, and a device on the driving means having a wiping engagement with the kicker.

3. In an aerial camera, the combination with a camera body having a dark chamber for registering instruments, and means for illuminating the same including an electric circuit provided with a switch, of film feeding devices, a locking means therefor, vacuum creating means operating to hold the film flat in the focal plane of the camera, a shutter, a counter, a plurality of spring motors for actuating the film feeding devices, the vacuum creating means and the shutter, of a continuously operating driving means, a clutch, a frequency mechanism operated by the driving means to throw out the clutch, and embodying a progressively operated trip and a spring for returning the same to a set position, and a cycle member operated by the driving means through the clutch to successively perform the following operations in the order named: trip the motor of the vacuum creating means; close the switch; disconnect the frequency mechanism to allow the trip thereof to return; trip the shutter operating motor; release the film locking means; trip the motor of the film feeding means; rewind the vacuum creating motor; rewind the shutter motor; actuate the counter; open the switch and actuate the clutch releasing means.

4. In an aerial camera, the combination with a camera body having a dark chamber for registering instruments, and means for illuminating the same including an electric circuit provided with a switch, of film feeding devices, a locking means therefor, vacuum creating means operating to hold the film flat in the focal plane of the camera, a shutter, a counter, a plurality of spring motors for actuating the film feeding devices, the vacuum creating means and the shutter, of a cycle member operated by the driving means through the clutch to successively perform the following operations in the order named: trip the motor of the vacuum creating means, close the switch; trip the shutter operating motor; release the film locking means; trip the motor of the film feeding means; rewind the vacuum creating motor; rewind the shutter motor; actuate the counter; and open the switch.

5. In an aerial camera, the combination with a camera body having a lens disposed with its axis vertical, means at the top thereof for shifting sensitive material in the focal plane of said camera and a shutter, of a case mounted at one side of said body, mechanism therein for automatically and successfully operating the shifting means and shutter in timed relation to each other and a motor for driving said mechanism mounted on the body and having a shaft extending into the case.

6. In an aerial camera, the combination with a camera body having a plurality of attached mechanisms for operations incident to automatically exposing successive sensitive surfaces, of driving means adapted to operate continuously at uniform speed, a cycle member driven thereby to successively cooperate with the said mechanisms, a clutch connection between the driving means and cycle member, and a frequency mechanism driven by the driving mechanism and controlling the clutch.

7. In an aerial camera, the combination with a camera body having a plurality of attached mechanisms for operations incident to automatically exposing successive sensitive surfaces, of driving means adapted to operate continuously at uniform speed, a rotary cycle member progressively driven thereby in one direction to successively cooperate with each of the said mechanisms upon each of its own revolutions, a clutch connection between the driving means and cycle member and a frequency mechanism driven by the driving mechanism and controlling the clutch.

8. In an aerial camera, the combination with a camera body having a plurality of attached mechanisms for operations incident to automatically exposing successive sensitive surfaces, of driving means adapted to operate continuously at uniform speed, a cycle member driven thereby to successively cooperate with the said mechanisms, a clutch connection between the driving means and cycle member, a frequency mechanism controlling the clutch and a driving connection between the driving means and the frequency mechanism controlled by the cycle member.

9. In an aerial camera, the combination with a camera body having a plurality of attached mechanisms for operations incident to automatically exposing successive sensitive surfaces, of driving means adapted to operate continuously at uniform speed, a cycle member driven thereby to successively cooperate with the said mechanisms, a clutch connection between the driving means and cycle member, a frequency mechanism driven by the driving mechanism and controlling the clutch and manually operable means for independently controlling said clutch.

10. In an aerial camera, the combination with a camera body having a plurality of attached mechanisms for operations incident to automatically exposing successive sensitive surfaces, each of said mechanisms embodying a spring motor for actuating the same, of continuously operating driving means, a cycle member driven thereby to successfully cooperate with the said mechanisms to first release them and then rewind the motor springs thereof, a clutch connection between the driving means and cycle member and a frequency mechanism driven by the driving mechanism and controlling the clutch.

11. In an aerial camera, the combination with a camera body having a plurality of attached mechanisms for operations incident to automatically exposing successive sensitive surfaces, each of said mechanisms embodying a spring motor for actuating the same, of a rotary cycle member intermittently driven in one direction to successfully cooperate with the said mechanisms to first release them and to then rewind the motor springs thereof.

12. In an aerial camera, the combination with a camera body having a plurality of attached mechanisms for operations incident to automatically exposing successive sensitive surfaces, each of said mechanisms embodying a spring motor for actuating the same, of a cycle member adapted to successively cooperate with the said mechanisms to first release them and to then rewind the motor springs thereof.

13. In an aerial camera, the combination with a camera body having a plurality of attached mechanisms for operation incident to automatically exposing successive sensitive surfaces, each of said mechanisms embodying a spring motor for actuating the same, of a continuously operating driving means, a rotary cycle member adapted upon each revolution to successively cooperate with the said mechanisms to first release them and to then rewind the motor springs thereof and a clutch between the driving means and cycle member adapted to be thrown out by the latter upon the completion of each such revolution.

14. In an aerial camera, the combination with a camera body having a plurality of attached mechanisms for operations incident to automatically exposing successive sensitive surfaces, each of said mechanisms embodying a spring motor for actuating the same, of a continuously operating driving means, a rotary cycle member adapted upon each revolution to successively cooperate with the said mechanisms to first release them and to then rewind the motor springs thereof, a clutch between the driving means and cycle member adapted to be thrown out by the latter upon the completion of each such revolution, and a frequency mechanism driven by the driving means and adapted to periodically throw in the clutch.

15. In an aerial camera, the combination with a camera body, means for feeding sensitive material in the focal plane thereof and a shutter mechanism, of automatic mechanism controlling said devices to cause their actuation in timed relationship comprising driving means adapted to operate continuously at uniform speed, a cycle member driven thereby to successively cooperate with the feeding means and shutter mechanism, a clutch connection between the driving means and cycle member, and a frequency mechanism driven by the driving mechanism and controlling the clutch.

16. In an aerial camera, the combination with a camera body having a plurality of attached mechanisms for performing operations incident to automatically exposing successive sensitive surfaces, of continuously operating driving means, a cycle member driven thereby to successively cooperate with the said mechanisms, a clutch connection between the driving means and cycle member, a frequency mechanism driven by the driving mechanism and adapted to effect engagement of the clutch and means actuated by the cycle member for releasing the clutch.

17. In an aerial camera, the combination with a camera body having a plurality of attached mechanisms for operations incident to automatically exposing successive sensitive surfaces, of continuously operating driving means, a rotary cycle member driven thereby to successively cooperate with the said mechanisms once upon each revolution, a clutch connection between the driving means and cycle member, a frequency mechanism driven by the driving mechanism and adapted to effect engagement of the clutch, and means actuated by the cycle member at the end of each revolution thereof for releasing the clutch.

18. In an aerial camera, the combination with a camera body having a plurality of attached mechanisms for performing operations incident to automatically exposing successive sensitive surfaces, of continuously operating driving means, a cycle member driven thereby to successively cooperate with the said mechanisms, a roller clutch connection between the driving means and cycle member embodying a ratchet wheel for unseating the rolls, a stop pawl adapted to cooperate with the ratchet wheel, a frequency mechanism driven by the driving mechanism and adapted to move the stop pawl out of engagement with the ratchet wheel and a connection on the stop pawl actuated by the cycle member to engage the stop pawl with the ratchet wheel and disengage the clutch.

19. In an aerial camera, the combination with a camera body having a plurality of attached mechanisms for performing operations incident to automatically exposing successive sensitive surfaces, of continuously operating driving means, a cycle member driven thereby to successively cooperate with the said mechanisms, a clutch connection between the driving means and cycle member, means normally holding said clutch disengaged, said means being moved to normal position by the cycle member and a frequency mechanism driven by the driving means and comprising a rotary element having an abutment thereon adapted to trip the said holding means.

20. In an aerial camera, the combination with a camera body having a plurality of attached mechanisms for performing operations incident to automatically exposing successive sensitive surfaces, of continuously operating driving means, a cycle member driven thereby to successively cooperate with the said mechanisms, a clutch connection between the driving means and cycle member, means normally holding said clutch disengaged, said means being moved to normal position by the cycle member, and a frequency mechanism driven by the driving means and comprising a rotary element having an abutment thereon adapted to trip the said holding means, a spring for returning the rotary element and abutment when the frequency mechanism is temporarily disconnected from the driving means, and a manually adjustable stop for regulating the resetting position of the abutment.

21. In an aerial camera, the combination with a camera body having a plurality of attached mechanisms for performing operations incident to automatically exposing successive sensitive surfaces, of continuously operating driving means, a cycle member driven thereby to successively cooperate with the said mechanisms, a clutch connection between the driving means and cycle member, means normally holding said clutch disengaged, said means being moved to normal position by the cycle member and a frequency mechanism driven with a step-by-step movement from the driving means and comprising a ratchet wheel having an abutment thereon adapted to trip the said holding means, a spring for returning the ratchet wheel and abutment when the former is temporarily disconnected from the driving means, an independently movable rotary element turning on the axis of the ratchet wheel and carrying a stop for regulating the resetting position of the abutment on the latter and means for manually adjusting said rotary element.

22. In an aerial camera, the combination with a camera body having a plurality of attached mechanisms for performing operations incident to automatically exposing successive sensitive surfaces, of continuously operating driving means, a cycle member driven thereby to successively cooperate with the said mechanisms, a clutch connection between the driving means and cycle member, a frequency mechanism adapted to effect engagement of the clutch, a driving connection between the driving means and the frequency mechanism and means actuated by the cycle member for disconnecting the driving connection while the frequency mechanism is being reset.

23. In an aerial camera, the combination with a camera body having a plurality of attached mechanisms for performing operations incident to automatically exposing successive sensitive surfaces, of continuously operating driving means, a cycle member driven thereby to successively cooperate with the said mechanisms, a clutch connection between the driving means and cycle member, a frequency mechanism adapted to effect engagement of the clutch, a driving connection between the driving means and the frequency mechanism, means actuated by the cycle member for disconnecting the driving connection while the frequency mechanism is being reset and means actuated by the cycle member for releasing the clutch.

24. In an aerial camera, the combination with a camera body having a plurality of attached mechanisms for performing operations incident to automatically exposing successive sensitive surfaces, of continuously operating driving means, a cycle member driven thereby to successively cooperate with the said mechanisms, a clutch connection between the driving means and cycle member, means normally holding said clutch disengaged, said means being moved to normal position by the cycle member and a frequency mechanism embodying a ratchet wheel having an abutment thereon adapted to trip the said holding means, a pawl operated by the driving means to advance the ratchet wheel step-by-step, a spring for returning the ratchet wheel and abutment when the pawl is thrown out, and means actuated by the cycle member for throwing out the pawl.

25. In an aerial camera, the combination with a camera body having a plurality of attached mechanisms for performing operations incident to automatically exposing successive sensitive surfaces, of continuously operating driving means, a cycle member driven thereby to successively cooperate with the said mechanisms, a clutch connection between the driving means and cycle member, means normally holding said clutch disengaged, said means being moved to normal position by the cycle member and a frequency mechanism embodying a ratchet wheel having an abutment thereon adapted to trip the said holding means, a feed pawl operated by the driving means to advance the ratchet wheel step-by-step, a holding pawl for the ratchet wheel, a spring for returning the ratchet wheel and abutment when the pawl is thrown out, and means actuated by the cycle member for throwing out both pawls.

26. In an aerial camera, the combination with a camera body having a plurality of attached mechanisms for performing operations incident to automatically exposing successive sensitive surfaces, of continuously operating driving means, a cycle member driven thereby to successively cooperate with the said mechanisms, a clutch connection between the driving means and cycle member, a clutch controlling member, a frequency mechanism embodying a rotary element having an abutment thereon adapted to engage the clutch controlling member and effect engagement of the clutch, driving gearing for advancing the rotary element by the driving means, a spring for returning the rotary element and abutment when the driving gear is disconnected and a manually controlled stop for limiting the return movement and reset position of said abutment, the stop being also adapted to operate to release the said driving gear.

27. In an aerial camera, the combination with a camera body having a plurality of attached mechanisms for performing operations incident to automatically exposing successive sensitive surfaces, of continuously operating driving means, a cycle member driven thereby to successively cooperate with the said mechanisms, a clutch connection between the driving means and cycle member, a clutch controlling member, a frequency mechanism embodying a ratchet wheel having an abutment thereon adapted to engage the clutch controlling member and effect engagement of the clutch, a pawl actuated by the driving gear for advancing the ratchet wheel step-by-step, a holding pawl a spring for returning the ratchet wheel and abutment when the pawls are disconnected and a manually controlled stop for limiting the return movement and reset position of said abutment, the stop being also adapted to operate to release both of said pawls.

28. In an aerial camera the combination with a camera body having a plurality of attached mechanisms for performing operations incident to automatically exposing successive sensitive surfaces, continuously operating driving means, a cycle member driven thereby to successively cooperate with the said mechanisms, and a roller clutch between the driving means and cycle member, said clutch embodying a ratchet wheel as a shifting medium, of a step pawl adapted to cooperate with the ratchet wheel to halt the same and disengage the rolls, said pawl being provided with a spring pressed engaging head for the purposes set forth.

29. In an aerial camera, the combination with a camera body, film feeding devices, vacuum creating means operating to hold the film flat in the focal plane of the camera, a shutter, a continuously operating driving means, a clutch connected therewith and a clutch releasing means, of a cycle member driven through the clutch and adapted upon each revolution to successively act upon the vacuum creating means, the shutter, the film feeding devices, and the clutch releasing means in the order named.

30. In an aerial camera, the combination with a camera body provided with film feeding devices, vacuum creating means operating to hold the film flat in the focal plane of the camera, shutter and a plurality of spring motors for actuating said elements, of a continuously operating driving means, a clutch connected therewith, a clutch releasing means and a cycle member driven through the clutch and adapted upon each revolution to successively trip the spring actuated element, to wind the motor springs thereof and, lastly, to actuate the clutch releasing means.

31. In a curtain shutter, the combination with shutter curtains, a pair of winding rolls therefor and a common operating member for the rolls embodying a reversible pinion, of a driving mechanism for the rolls and two sets of gearing adapted to alternately connect the driving mechanism and pinion and having an unequal number of gears therein.

32. In a curtain shutter, the combination with shutter curtains, a pair of winding rolls therefor and a common operating member for the rolls embodying a reversible pinion, of a driving mechanism for the rolls embodying a spring motor, winding means therefor and two driving gears, two sets of gearing connecting the respective driving gears to the pinion to operate the latter in opposite directions and a clutch adapted to alternately connect the motor with the driving gears.

33. In a curtain shutter, the combination with shutter curtains, a pair of winding rolls therefor and a common operating member for the rolls embodying a reversible pinion, of a driving mechanism for the rolls embodying a spring motor, winding means therefor and two driving gears, two sets of gearing connecting the respective driving gears to the pinion to operate the latter in opposite directions and a clutch operated by the winding means and adapted to alternately connect the motor with the driving gears.

34. In a curtain shutter, the combination with shutter curtains and a pair of winding rolls therefor, of a driving mechanism embodying two driving members connected to drive the rolls in opposite directions, a spring motor, a clutch adapted to alternately connect the latter with the driving members and means for winding the motor.

35. In a curtain shutter, the combination with shutter curtains and a pair of winding rolls therefor, of a driving mechanism embodying two driving members connected to drive the rolls in opposite directions, a spring motor, winding means therefor and a clutch operated by the winding means to alternately connect the motor with the driving members.

36. In a curtain shutter, the combination with shutter curtains and a pair of winding rolls therefor, of driving mechanism embodying two driving members connected to drive the rolls in opposite directions, a spring motor, winding means therefor, a clutch adapted to alternately connect the motor with the driving members, a shipper for said clutch and an eccentric driven by the winding means for actuating the shipper.

37. In a curtain shutter, the combination with shutter curtains and a pair of winding rolls therefor, of a driving mechanism embodying two driving members connected to drive the rolls in opposite directions, a spring motor, winding means therefor, a clutch adapted to alternately connect the motor with the driving members, a shipper for said clutch and an eccentric intermittently driven by the winding means in one direction for actuating the shipper.

38. In a curtain shutter, the combination with shutter curtains and a pair of winding rolls therefor, of a driving mechanism embodying two driving members connected to drive the rolls in opposite directions, a spring motor, a clutch adapted to alternately connect the latter with the driving members, a winding pinion for the motor, a clutch connecting it therewith and adapted to permit an idle return movement of the pinion, a controlling mechanism embodying a cycle member, a segment geared to the pinion and operated in two directions by the cycle member, and a detent for the motor tripped by the cycle member.

39. In a curtain shutter, the combination with shutter curtains and a pair of winding rolls therefor, of a driving mechanism embodying two driving members connected to drive the rolls in opposite directions, a spring motor, a clutch adapted to alternately connect the latter with the driving members, a winding pinion for the motor, a shipper for the clutch, an eccentric driven by the pinion to operate the shipper, a clutch connecting the pinion and motor and adapted to permit an idle return movement of the pinion, a controlling mechanism embodying a cycle member, a segment geared to the pinion and operated in two directions by the cycle member and a detent for the motor tripped by the cycle member.

40. In a curtain shutter, the combination with shutter curtains, a pair of winding rolls therefor and a common reversible operating member for the rolls, of a driving mechanism embodying two driving members connected to drive the operating member in opposite directions, a spring motor, a clutch adapted to alternately connect the latter with the driving members and means for winding the motor.

41. In a curtain shutter, the combination with shutter curtains, a pair of winding rolls therefor, a spring motor for driving the rolls and reversing mechanism interposed between the motor and the rolls, of winding means for the motor operating to automatically operate the reversing mechanism.

42. In a curtain shutter, the combination with shutter curtains, a pair of winding rolls therefor, a spring motor for driving the rolls and reversing mechanism interposed between the motor and the rolls, of winding means for the motor and embodying a pinion, a detent for the motor member and a cycle member geared to the pinion and adapted to trip the detent.

43. In a curtain shutter, the combination with shutter curtains, a pair of winding rolls therefor, a spring motor for driving the rolls and reversing mechanism interposed between the motor and the rolls, of winding means for the motor, a detent for the latter and a cycle member adapted to trip the detent and to actuate the winding means.

44. In an automatic camera, the combination with a camera body having a foraminous air chest in the focal plane thereof and means for feeding a strip of film across said chest, of a vacuum producing means connected to exhaust the chest, a spring motor for driving said vacuum producing means and mechanism for winding and tripping the motor.

45. In an automatic camera, the combination with a camera body having a foraminous air chest in the focal plane thereof and means for feeding a strip of film across said chest, of a vacuum producing means connected to exhaust the chest, a spring motor for driving said vacuum producing means and controlling mechanism embodying a cycle member operatively connected to the film feeding means and provided with cams for winding and tripping the spring motor.

46. In an automatic camera, the combination with a camera body having a foraminous air chest in the focal plane thereof and means for feeding a strip of film across said chest, of a dash pot, a rock shaft having an arm connected to the piston thereof, a spring on the shaft operating to withdraw the piston, and means for winding and tripping the spring.

47. In an automatic camera, the combination with a camera body having a foraminous air chest in the focal plane thereof and means for feeding a strip of film across said chest, of a dash pot, a rock shaft having an arm connected to the piston thereof, a spring on the shaft operating to withdraw the piston, a second arm on the shaft, a pull rod connected thereto, a lever for operating the pull rod, a catch adapted to restrain the lever and a cycle member connected with the film feeding means and having a cam thereon for setting the lever and an abutment for tripping the catch.

48. In an aerial camera, the combination with a camera body provided with means for feeding sensitive material in the focal plane of the camera and a plurality of devices successively operable in timed relationship to effect a regulated exposure of the material, of controlling mechanism for said devices embodying a cycle member adapted to successively cooperate therewith and a frequency mechanism adapted to automatically time the interval between recurrent actuations of the cycle member.

49. In an aerial camera, the combination with a camera body provided with means for feeding sensitive material in the focal plane of the camera and a plurality of devices successively operable in timed relationship to effect a regulated exposure of the material, of controlling mechanism for said device embodying a cycle member adapted to successively cooperate therewith and a frequency mechanism adapted to automatically time the intervals between recurrent actuations of the cycle member, and manually operated means arranged at a distance from the camera for adjusting the frequency mechanism.

50. In an aerial camera, the combination with a camera body provided with a plurality of adjustable devices successively operable to effect automatic regulated exposure of sensitive material in the focal plane of the camera, of a control box located at a distance from said camera and provided with a plurality of manually operable controls for said devices, and power transmitting means connecting the latter and said controls.

51. In an aerial camera, the combination with a camera body provided with a plurality of adjustable devices successively operable to effect a regulated exposure of sensitive material in the focal plane of the camera, of a control box located at a distance from said camera comprising a casing, a relatively movable shaft and sleeve extending into the casing, manually operable members on the shaft and sleeve arranged exteriorly of the casing, pulleys arranged on the shaft and sleeve, respectively, within the casing, an idle pulley mounted on the same axis between said pulleys, a third manually operable member on the casing provided with a pulley, and power transmitting means running from the respective pulleys to the adjustable devices, that on the last mentioned manually operable member being common to the idle pulley.

BENJAMIN DAY CHAMBERLIN.